United States Patent
Bhadra et al.

(10) Patent No.: US 9,808,755 B2
(45) Date of Patent: Nov. 7, 2017

(54) SOUR PRESSURE SWING ADSORPTION PROCESS

(71) Applicant: AIR PRODUCTS AND CHEMICALS, INC., Allentown, PA (US)

(72) Inventors: Shubhra Jyoti Bhadra, Macungie, PA (US); Andrew David Wright, Guildford (GB); Jeffrey Raymond Hufton, Fogelsville, PA (US); Jeffrey William Kloosterman, Allentown, PA (US); Fabrice Amy, Macungie, PA (US); Edward Landis Weist, Jr., Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 140 days.

(21) Appl. No.: 14/808,069

(22) Filed: Jul. 24, 2015

(65) Prior Publication Data
US 2017/0021301 A1   Jan. 26, 2017

(51) Int. Cl.
*B01D 53/047* (2006.01)
*C01B 3/56* (2006.01)
*C01B 17/04* (2006.01)

(52) U.S. Cl.
CPC ............ *B01D 53/047* (2013.01); *C01B 3/56* (2013.01); *C01B 17/0404* (2013.01); *B01D 2256/16* (2013.01); *B01D 2256/22* (2013.01); *B01D 2257/304* (2013.01); *B01D 2257/504* (2013.01); *B01D 2257/70* (2013.01); *B01D 2259/40056* (2013.01); *B01D 2259/4067* (2013.01);
(Continued)

(58) Field of Classification Search
CPC .............................. B01D 53/047; C01B 3/56
See application file for complete search history.

(56) References Cited

U.S. PATENT DOCUMENTS 3,564,816 A   2/1971   Batta
3,797,201 A   3/1974   Tamura
(Continued)

FOREIGN PATENT DOCUMENTS

EP   0257493 A1   3/1988
EP   1125623 A1   8/2001
(Continued)

OTHER PUBLICATIONS

Reynolds, Steven P., Heavy Reflux PSA Cycles For CO2 Recovery From Flue Gas: Part 1. Performance Evaluation, Adsorption, vol. 4, pp. 399-413 (2008).
(Continued)

*Primary Examiner* — Melvin C Mayes
*Assistant Examiner* — Kenneth Vaden
(74) *Attorney, Agent, or Firm* — Amy Carr-Trexler

(57) ABSTRACT

Methods and apparatuses for separating $CO_2$ and sulfur-containing compounds from a synthesis gas obtained from gasification of a carbonaceous feedstock. The primary separating steps are performed using a sour pressure swing adsorption (SPSA) system, followed by an acid gas enrichment system and a sulfur removal unit. The SPSA system includes multiple pressure equalization steps and a rinse step using a rinse gas that is supplied from a source other than directly from one of the adsorber beds of the SPSA system.

18 Claims, 20 Drawing Sheets

(52) U.S. Cl.
CPC .. *B01D 2259/41* (2013.01); *C01B 2203/0283* (2013.01); *C01B 2203/042* (2013.01); *C01B 2203/043* (2013.01); *C01B 2203/047* (2013.01); *C01B 2203/048* (2013.01); *C01B 2203/0475* (2013.01); *C01B 2203/0485* (2013.01); *C01B 2203/061* (2013.01); *C01B 2203/068* (2013.01); *C01B 2203/86* (2013.01); *Y02C 10/08* (2013.01); *Y02P 30/30* (2015.11)

(56) References Cited

U.S. PATENT DOCUMENTS

| | | | |
|---|---|---|---|
| 3,986,849 A | 10/1976 | Fuderer et al. | |
| 4,077,779 A | 3/1978 | Sircar et al. | |
| 4,171,206 A | 10/1979 | Sircar | |
| 4,171,207 A | 10/1979 | Sircar | |
| 4,333,744 A | 6/1982 | Fuderer | |
| 4,375,363 A | 3/1983 | Fuderer | |
| 4,472,177 A | 9/1984 | Sircar | |
| 4,475,929 A | 10/1984 | Fuderer | |
| 4,515,605 A | 5/1985 | Inoue et al. | |
| 4,578,089 A | 3/1986 | Richter et al. | |
| 4,705,541 A | 11/1987 | Sircar | |
| 4,723,966 A | 2/1988 | Fuderer | |
| 4,761,167 A | 8/1988 | Nicholas et al. | |
| 4,770,676 A | 9/1988 | Sircar et al. | |
| 4,790,858 A | 12/1988 | Sircar | |
| 4,813,977 A | 3/1989 | Schmidt et al. | |
| 4,813,980 A | 3/1989 | Sircar | |
| 4,836,833 A | 6/1989 | Nicholas et al. | |
| 4,846,851 A | 7/1989 | Guro et al. | |
| 4,869,894 A | 9/1989 | Wang et al. | |
| 4,892,565 A | 1/1990 | Schmidt et al. | |
| 4,917,710 A | 4/1990 | Haruna et al. | |
| 4,985,052 A | 1/1991 | Haruna et al. | |
| 4,986,835 A | 1/1991 | Uno et al. | |
| 5,032,150 A | 7/1991 | Knaebel | |
| 5,133,785 A | 7/1992 | Kumar et al. | |
| 5,135,548 A | 8/1992 | Golden et al. | |
| 5,395,427 A | 3/1995 | Kumar et al. | |
| 5,486,227 A | 1/1996 | Kumar et al. | |
| 5,711,926 A | 1/1998 | Knaebel | |
| 5,938,819 A | 8/1999 | Seery | |
| 6,096,115 A | 8/2000 | Kleinberg et al. | |
| 6,102,985 A | 8/2000 | Naheiri et al. | |
| 6,322,612 B1 | 11/2001 | Sircar et al. | |
| 7,147,691 B2 * | 12/2006 | Palmer | B01D 53/1456 423/220 |
| 8,029,603 B2 | 10/2011 | Weist, Jr. et al. | |
| 8,268,044 B2 | 9/2012 | Wright et al. | |
| 8,337,674 B2 | 12/2012 | Weist et al. | |
| 2009/0107331 A1 | 4/2009 | Urakami | |
| 2010/0300288 A1 * | 12/2010 | Boulet | B01D 53/0473 95/96 |
| 2012/0204599 A1 * | 8/2012 | Northrop | C10L 3/10 62/617 |
| 2013/0315794 A1 * | 11/2013 | Schaffer | C01B 3/501 422/187 |
| 2014/0069275 A1 | 3/2014 | Rifflart et al. | |

FOREIGN PATENT DOCUMENTS

| | | | |
|---|---|---|---|
| WO | WO 2013/062413 | * | 5/2013 |
| WO | WO 2013/122467 | * | 8/2013 |

OTHER PUBLICATIONS

Ribeiro, A.M., Pressure Swing Adsorption Process in Coal to Fischer—Tropsch Fuel with CO2 Capture Energy Fuel: vol. 26, pp. 1246-1253 (2012).

Na, B. K., Effect of Rinse and Recycle Methods on the Pressure Swing Adsorption Process to Recover CO2 From Power Plant Flue Gas Using Activated Carbon, Ind. Eng. Chem., vol. 41, pp. 5498-5503 (2002).

Grande, Carlos A., Carbon Molecular Sieves for Hydrocarbon Separations by Adsorption, Ind. Eng. Chem. Res., vol. 44, pp. 7218-7227 (2005).

Park, J. H., Numerical Analysis on the Power Consumption of the PSA Process for Recovering CO2 From Flue Gas, Ind. Eng. Chem Res., vol. 41, pp. 4122-4131 (2002).

van Selow, E. R., Carbon Capture by Sorption-Enhanced Water-Gas Shift Reaction Process Using Hydrotalcite-Based Material, Ind. Eng. Chem. Res., vol. 48, pp. 4184-4193 (2009).

Najmi, Bita, Simulation of the Cyclic Operation of a PSA-Based SEWGS Process for Hydrogen Production With CO2 Capture, Energy Procedia, vol. 37, pp. 2293-2302 (2013).

Bhadra, S. J., Carbon Monoxide Isotope Enrichment and Separation by Pressure Swing Adsorption, vol. 19, pp. 11-23 (2013).

* cited by examiner

Cycle Step Being Performed in Bed During Different Phases of Multi-Step SPSA Cycle (Cycle of Figure 3)

| Phase # | 1 | 2 | 3 | 4 | 5 | 6 | 7 | 8 | 9 | 10 |
|---|---|---|---|---|---|---|---|---|---|---|
| Bed # | | | | | | | | | | |
| 1 | F1 | F1 | F2 | F2 | EQ1D/R | EQ2D/R | EQ3D | EQ4D | EQ5D | CnD |
| 2 | F2 | F2 | EQ1D/R | EQ2D/R | EQ3D | EQ4D | EQ5D | CnD | CnD | PU |
| 3 | EQ1D/R | EQ2D/R | EQ3D | EQ4D | EQ5D | CnD | CnD | PU | PU | PU |
| 4 | EQ3D | EQ4D | EQ5D | CnD | CnD | PU | PU | PU | PU | EQ5R |
| 5 | EQ5D | CnD | CnD | PU | PU | PU | PU | EQ5R | EQ5R | EQ4R |
| 6 | CnD | PU | PU | PU | PU | EQ5R | EQ5R | EQ4R | EQ3R | EQ2R |
| 7 | PU | PU | EQ5R | EQ4R | EQ4R | EQ4R | EQ3R | EQ2R | EQ1R | RP |
| 8 | EQ5R | EQ4R | EQ3R | EQ2R | EQ3R | EQ2R | EQ1R | RP | F1 | F1 |
| 9 | EQ3R | EQ2R | EQ1R | RP | EQ1R | RP | F1 | F2 | F2 | F2 |
| 10 | EQ1R | RP | F1 | F1 | F2 | F2 | EQ1D/R | EQ2D/R | EQ3D | EQ4D |

Figure 9A

Cycle Step Being Performed in Bed During Different Phases of Multi-Step SPSA Cycle (Cycle of Figure 3)

| Phase # | 11 | 12 | 13 | 14 | 15 | 16 | 17 | 18 | 19 | 20 |
|---|---|---|---|---|---|---|---|---|---|---|
| Bed # | | | | | | | | | | |
| 1 | CnD | PU | PU | PU | EQ5R | EQ4R | EQ3R | EQ2R | EQ1R | RP |
| 2 | PU | PU | EQ5R | EQ4R | EQ3R | EQ2R | EQ1R | RP | F1 | F1 |
| 3 | EQ5R | EQ4R | EQ3R | EQ2R | EQ1R | RP | F1 | F1 | F2 | F2 |
| 4 | EQ3R | EQ2R | EQ1R | RP | F1 | F1 | F2 | F2 | EQ1D/R | EQ2D/R |
| 5 | EQ1R | RP | F1 | F1 | F2 | F2 | EQ1D/R | EQ2D/R | EQ3D | EQ4D |
| 6 | F1 | F1 | F2 | F2 | EQ1D/R | EQ2D/R | EQ3D | EQ4D | EQ5D | CnD |
| 7 | F2 | F2 | EQ1D/R | EQ2D/R | EQ3D | EQ4D | EQ5D | CnD | CnD | PU |
| 8 | EQ1D/R | EQ2D/R | EQ3D | EQ4D | EQ5D | CnD | CnD | PU | PU | PU |
| 9 | EQ3D | EQ4D | EQ5D | CnD | PU | PU | EQ5R | EQ4R | EQ5R | EQ4R |
| 10 | EQ5D | CnD | CnD | PU | PU | EQ4R | EQ5R | EQ4R | EQ3R | EQ2R |

Figure 9B

Cycle Step Being Performed in Bed During Different Phases of Multi-Step SPSA Cycle (Cycle of Figure 4)

| Phase # | 1 | 2 | 3 | 4 | 5 | 6 | 7 | 8 | 9 | 10 |
|---|---|---|---|---|---|---|---|---|---|---|
| Bed # | | | | | | | | | | |
| 1 | F1 | F2 | F2 | F2 \| R | EQ1D | EQ2D | EQ3D | EQ4D | PPU | PPU |
| 2 | F2 \| R | EQ2D | EQ1D | EQ2D | EQ3D | EQ4D | PPU | PPU | CnD | CnD |
| 3 | EQ1D | EQ2D | EQ3D | EQ4D | PPU | PPU | CnD | CnD | PU | PU |
| 4 | EQ3D | EQ4D | PPU | PPU | CnD | CnD | PU | PU | — | EQ4R |
| 5 | PPU | PPU | CnD | CnD | PU | PU | — | EQ4R | EQ3R | EQ2R |
| 6 | CnD | CnD | PU | PU | — | PU | — | EQ4R | EQ3R | EQ2R |
| 7 | PU | PU | — | EQ4R | EQ3R | EQ4R | EQ3R | EQ2R | EQ1R/RP | RP |
| 8 | — | EQ4R | EQ3R | EQ2R | EQ1R/RP | EQ2R | EQ1R/RP | RP | F1 | F2 |
| 9 | EQ3R | EQ2R | EQ1R/RP | RP | F1 | F2 | F2 | F2 \| R | EQ1D | EQ2D |
| 10 | EQ1R/RP | RP | F1 | F2 | F2 | F2 \| R | EQ1D | EQ2D | EQ3D | EQ4D |

Figure 10A

Cycle Step Being Performed in Bed During Different Phases of Multi-Step SPSA Cycle (Cycle of Figure 4)

| Phase # | 11 | 12 | 13 | 14 | 15 | 16 | 17 | 18 | 19 | 20 |
|---|---|---|---|---|---|---|---|---|---|---|
| Bed # | | | | | | | | | | |
| 1 | CnD | CnD | PU | PU | – | EQ4R | EQ3R | EQ2R | EQ1R/RP | RP |
| 2 | PU | PU | – | EQ4R | EQ3R | EQ2R | EQ1R/RP | RP | F1 | F2 |
| 3 | – | EQ4R | EQ3R | EQ2R | EQ1R/RP | RP | F1 | F2 | F2 | F2 \| R |
| 4 | EQ3R | EQ2R | EQ1R/RP | RP | F1 | F2 | F2 | F2 \| R | EQ1D | EQ2D |
| 5 | EQ1R/RP | RP | F1 | F2 | F2 | F2 \| R | EQ1D | EQ2D | EQ3D | EQ4D |
| 6 | F1 | F2 | F2 | F2 \| R | EQ1D | EQ2D | EQ3D | EQ4D | PPU | PPU |
| 7 | F2 | F2 \| R | EQ1D | EQ2D | EQ3D | EQ4D | PPU | PPU | CnD | CnD |
| 8 | EQ1D | EQ2D | EQ3D | EQ4D | PPU | PPU | CnD | CnD | PU | PU |
| 9 | EQ3D | EQ4D | PPU | PPU | CnD | CnD | PU | PU | – | EQ4R |
| 10 | PPU | PPU | CnD | CnD | PU | PU | – | EQ4R | EQ3R | EQ2R |

Figure 10B

Cycle Step Being Performed in Bed During Different Phases of Multi-Step SPSA Cycle (Cycle of Figure 5)

| Phase # | 1 | 2 | 3 | 4 | 5 | 6 | 7 | 8 | 9 | 10 |
|---|---|---|---|---|---|---|---|---|---|---|
| Bed # | | | | | | | | | | |
| 1 | F1 | F2 | F2 | F2 \| R | EQ1D | EQ2D | EQ3D | EQ4D | PPU | PPU |
| 2 | F2 | F2 \| R | EQ1D | EQ2D | EQ3D | EQ4D | PPU | PPU | CnD | CnD |
| 3 | EQ1D | EQ2D | EQ3D | EQ4D | PPU | PPU | CnD | CnD | PU | PU |
| 4 | EQ3D | EQ4D | PPU | PPU | CnD | CnD | PU | PU | — | — |
| 5 | PPU | PPU | CnD | CnD | PU | PU | — | — | EQ3R | EQ4R |
| 6 | CnD | CnD | PU | PU | — | — | EQ3R | EQ4R | EQ1R/RP | EQ2R |
| 7 | PU | PU | — | — | EQ3R | EQ4R | EQ1R/RP | EQ2R | EQ3R | RP |
| 8 | — | — | EQ3R | EQ4R | EQ1R/RP | EQ2R | EQ3R | RP | F1 | F2 |
| 9 | EQ3R | EQ2R | EQ1R/RP | EQ2R | F1 | F2 | F2 | F2 | F2 | F2 \| R |
| 10 | EQ1R/RP | RP | F1 | F2 | F2 | F2 \| R | EQ1D | EQ2D | EQ3D | EQ4D |

Figure 11A

Cycle Step Being Performed in Bed During Different Phases of Multi-Step SPSA Cycle (Cycle of Figure 5)

| Phase # | 11 | 12 | 13 | 14 | 15 | 16 | 17 | 18 | 19 | 20 |
|---|---|---|---|---|---|---|---|---|---|---|
| Bed # | | | | | | | | | | |
| 1 | CnD | CnD | PU | PU | — | EQ4R | EQ3R | EQ2R | EQ1R/RP | RP |
| 2 | PU | PU | — | EQ4R | EQ3R | EQ2R | EQ1R/RP | RP | F1 | F2 |
| 3 | — | EQ4R | EQ3R | EQ2R | EQ1R/RP | RP | F1 | F2 | F2 | F2 \| R |
| 4 | EQ3R | EQ2R | EQ1R/RP | RP | F1 | F2 | F2 | F2 \| R | EQ1D | EQ2D |
| 5 | EQ1R/RP | RP | F1 | F2 | F2 | F2 \| R | EQ1D | EQ2D | EQ3D | EQ4D |
| 6 | F1 | F2 | F2 | F2 \| R | EQ1D | EQ2D | EQ3D | EQ4D | PPU | PPU |
| 7 | F2 | F2 \| R | EQ1D | EQ2D | EQ3D | EQ4D | PPU | PPU | CnD | CnD |
| 8 | EQ1D | EQ2D | EQ3D | EQ4D | PPU | PPU | CnD | CnD | PU | PU |
| 9 | EQ3D | EQ4D | PPU | PPU | CnD | PU | PU | PU | — | EQ4R |
| 10 | PPU | PPU | CnD | CnD | PU | — | EQ3R | EQ4R | EQ3R | EQ2R |

Figure 11B

Cycle Step Being Performed in Bed During Different Phases of Multi-Step SPSA Cycle (Cycle of Figure 6)

| Phase # | 1 | 2 | 3 | 4 | 5 | 6 | 7 | 8 | 9 | 10 |
|---|---|---|---|---|---|---|---|---|---|---|
| Bed # | | | | | | | | | | |
| 1 | F1 | F2 | F2 | F2\|R | EQ1D | EQ2D | EQ3D | EQ4D | PPU | PPU |
| 2 | F2\|R | EQ1D | EQ1D | EQ2D | EQ3D | EQ4D | PPU | PPU | CnD | CnD |
| 3 | EQ1D | EQ2D | EQ3D | EQ4D | PPU | PPU | CnD | CnD | PU | PU |
| 4 | EQ3D | EQ4D | PPU | PPU | CnD | CnD | PU | PU | LR | EQ4R |
| 5 | PPU | PPU | CnD | CnD | PU | PU | LR | EQ4R | EQ3R | EQ2R |
| 6 | CnD | CnD | PU | PU | LR | EQ4R | EQ3R | EQ2R | EQ1R/RP | RP |
| 7 | PU | PU | LR | EQ4R | EQ3R | EQ2R | EQ1R/RP | RP | F2 | F2\|R |
| 8 | LR | EQ4R | EQ3R | EQ2R | EQ1R/RP | RP | F2 | F2\|R | F2 | F2\|R |
| 9 | EQ3R | EQ2R | EQ1R/RP | RP | F1 | F2 | F1 | F2 | EQ1D | EQ2D |
| 10 | EQ1R/RP | RP | F1 | F2 | F2 | F2 | EQ1D | EQ2D | EQ3D | EQ4D |

Figure 12A

Cycle Step Being Performed in Bed During Different Phases of Multi-Step SPSA Cycle (Cycle of Figure 6)

| Phase # | 11 | 12 | 13 | 14 | 15 | 16 | 17 | 18 | 19 | 20 |
|---|---|---|---|---|---|---|---|---|---|---|
| Bed # | | | | | | | | | | |
| 1 | CnD | CnD | PU | PU | LR | EQ4R | EQ3R | EQ2R | EQ1R/RP | RP |
| 2 | PU | PU | LR | EQ4R | EQ3R | EQ2R | EQ1R/RP | RP | F1 | F2 |
| 3 | LR | EQ4R | EQ3R | EQ2R | EQ1R/RP | RP | F1 | F2 | F2 | F2 |
| 4 | EQ3R | EQ2R | EQ2R | RP | F1 | F2 | F2 | F2 | F2 | F2 / R |
| 5 | EQ1R/RP | RP | EQ1R/RP | F1 | F2 | F2 / R | EQ1D | EQ2D | EQ1D | EQ2D |
| 6 | F1 | F2 | F1 | F2 | F2 | EQ2D | EQ3D | EQ4D | EQ3D | EQ4D |
| 7 | F2 | F2 / R | F2 | F2 / R | EQ1D | EQ4D | PPU | PPU | PPU | PPU |
| 8 | EQ1D | EQ2D | EQ1D | EQ2D | EQ3D | PPU | CnD | CnD | CnD | CnD |
| 9 | EQ3D | EQ4D | EQ3D | EQ4D | PPU | CnD | PU | PU | PU | PU |
| 10 | PPU | PPU | PPU | CnD | CnD | PU | LR | EQ4R | EQ3R | EQ2R |

Figure 12B

Cycle Step Being Performed in Bed During Different Phases of Multi-Step SPSA Cycle (Cycle of Figure 7)

| Phase # | 1 | 2 | 3 | 4 | 5 | 6 | 7 | 8 | 9 | 10 |
|---|---|---|---|---|---|---|---|---|---|---|
| Bed # | | | | | | | | | | |
| 1 | F1 | F2 \| F3 | F4 | F4 \| R | EQ1D | EQ2D | EQ3D | EQ4D | PPU | PPU |
| 2 | F4 | F4 \| R | EQ1D | EQ2D | EQ3D | EQ4D | PPU | PPU | CnD | CnD |
| 3 | EQ1D | EQ2D | EQ3D | EQ4D | PPU | PPU | CnD | CnD | PU | PU |
| 4 | EQ3D | EQ4D | PPU | PPU | CnD | CnD | PU | PU | — | — |
| 5 | PPU | PPU | CnD | CnD | PU | PU | — | EQ4R | EQ3R | EQ4R |
| 6 | CnD | CnD | PU | PU | — | EQ4R | EQ3R | EQ2R | EQ1R/RP | EQ2R |
| 7 | PU | PU | — | EQ4R | EQ3R | EQ2R | EQ1R/RP | RP | RP | RP |
| 8 | — | EQ4R | EQ3R | EQ2R | EQ1R/RP | RP | F1 | F2 \| F3 | F1 | F2 \| F3 |
| 9 | EQ3R | EQ2R | EQ1R/RP | RP | F1 | F4 | F4 | F4 \| R | F4 | F4 \| R |
| 10 | EQ1R/RP | RP | F1 | F2 \| F3 | F4 | F4 \| R | EQ1D | EQ2D | EQ3D | EQ4D |

Figure 13A

Cycle Step Being Performed in Bed During Different Phases of Multi-Step SPSA Cycle (Cycle of Figure 7)

| Phase # | 11 | 12 | 13 | 14 | 15 | 16 | 17 | 18 | 19 | 20 |
|---|---|---|---|---|---|---|---|---|---|---|
| Bed # | | | | | | | | | | |
| 1 | CnD | CnD | PU | PU | — | EQ4R | EQ3R | EQ2R | EQ1R/RP | RP |
| 2 | PU | PU | — | EQ4R | EQ3R | EQ2R | EQ1R/RP | RP | F1 | F2 F3 |
| 3 | — | EQ4R | EQ3R | EQ2R | EQ1R/RP | RP | F1 | F2 F3 | F4 | F4 R |
| 4 | EQ3R | EQ2R | EQ1R/RP | RP | F1 | F2 F3 | F4 | F4 R | EQ1D | EQ2D |
| 5 | EQ1R/RP | RP | F1 | F2 F3 | F4 | F4 R | EQ1D | EQ2D | EQ3D | EQ4D |
| 6 | F1 | F2 F3 | F4 | F4 R | EQ1D | EQ2D | EQ3D | EQ4D | PPU | PPU |
| 7 | F4 | F4 R | EQ1D | EQ2D | EQ3D | EQ4D | PPU | PPU | CnD | CnD |
| 8 | EQ1D | EQ2D | EQ3D | EQ4D | PPU | PPU | CnD | CnD | PU | PU |
| 9 | EQ3D | EQ4D | PPU | PPU | CnD | CnD | PU | PU | — | EQ4R |
| 10 | PPU | PPU | CnD | CnD | PU | PU | — | EQ4R | EQ3R | EQ2R |

Figure 13B

Cycle Step Being Performed in Bed During Different Phases of Multi-Step SPSA Cycle (Cycle of Figure 8)

| Phase # | 1 | 2 | 3 | 4 | 5 | 6 | 7 | 8 | 9 | 10 |
|---|---|---|---|---|---|---|---|---|---|---|
| Bed # | | | | | | | | | | |
| 1 | F1 | F2 | F2 | F2 | EQ1D | EQ2D | EQ3D | EQ4D/R | PPU | PPU |
| 2 | F2 | F2 | EQ1D | EQ2D | EQ3D | EQ4D/R | PPU | PPU | CnD | CnD |
| 3 | EQ1D | EQ2D | EQ3D | EQ4D/R | PPU | PPU | CnD | CnD | PU | PU |
| 4 | EQ3D | EQ4D/R | PPU | PPU | CnD | CnD | PU | PU | — | EQ4R |
| 5 | PPU | PPU | CnD | CnD | PU | PU | — | EQ4R | EQ3R | EQ2R |
| 6 | CnD | CnD | PU | PU | — | EQ4R | EQ3R | EQ2R | EQ1R/RP | RP |
| 7 | PU | PU | — | EQ4R | EQ3R | EQ2R | EQ1R/RP | RP | F1 | F2 |
| 8 | — | EQ4R | EQ3R | EQ2R | EQ1R/RP | RP | F1 | F2 | F2 | F2 |
| 9 | EQ3R | EQ2R | EQ1R/RP | RP | F1 | F2 | F2 | F2 | EQ1D | EQ2D |
| 10 | EQ1R/RP | RP | F1 | F2 | F2 | F2 | EQ1D | EQ2D | EQ3D | EQ4D/R |

Figure 14A

Cycle Step Being Performed in Bed During Different Phases of Multi-Step SPSA Cycle (Cycle of Figure 8)

| Phase # | 11 | 12 | 13 | 14 | 15 | 16 | 17 | 18 | 19 | 20 |
|---|---|---|---|---|---|---|---|---|---|---|
| Bed # | | | | | | | | | | |
| 1 | CnD | CnD | PU | PU | — | EQ4R | EQ3R | EQ2R | EQ1R/RP | RP |
| 2 | PU | PU | — | EQ4R | EQ3R | EQ2R | EQ1R/RP | RP | F1 | F2 |
| 3 | — | EQ4R | EQ3R | EQ2R | EQ1R/RP | RP | F1 | F2 | F2 | F2 |
| 4 | EQ3R | EQ2R | EQ1R/RP | RP | F1 | F2 | F2 | F2 | EQ1D | EQ2D |
| 5 | EQ1R/RP | RP | F1 | F2 | F2 | F2 | EQ1D | EQ2D | EQ3D | EQ4D/R |
| 6 | F1 | F2 | F2 | F2 | EQ1D | EQ2D | EQ3D | EQ4D/R | PPU | PPU |
| 7 | F2 | F2 | EQ1D | EQ2D | EQ3D | EQ4D/R | PPU | PPU | CnD | CnD |
| 8 | EQ1D | EQ2D | EQ3D | EQ4D/R | PPU | PPU | CnD | CnD | PU | PU |
| 9 | EQ3D | EQ4D/R | PPU | PPU | CnD | CnD | PU | PU | — | EQ4R |
| 10 | PPU | PPU | CnD | CnD | PU | PU | — | EQ4R | EQ3R | EQ2R |

Figure 14B

SOUR PRESSURE SWING ADSORPTION PROCESS

STATEMENT REGARDING FEDERALLY SPONSORED RESEARCH OR DEVELOPMENT

This invention was made with government support under Contract Number DE-FE0013363 between Air Products and Chemicals, Inc. and the U.S. Department of Energy. The Government has certain rights to this invention.

BACKGROUND OF THE INVENTION

The separation of a sour (e.g., sulfur containing) synthesis gas ("syngas"), for example as obtained from the gasification of solid or liquid carbonaceous feedstock, is often used to obtain a $H_2$ product stream suitable for use, for example, in chemical plants, refineries, or as fuel for a gas turbine. It is known that the $H_2$ constituent of $NH_3$ or MeOH syngas can be produced from a variety of processes, such as steam reforming of natural gas or naphtha, partial oxidation of hydrocarbon feedstocks, gasification of solid fuels, or other similar processes. However, such processes could result in a crude syngas stream containing the desired $H_2$, but also containing impurities like $CO_2$, CO, $CH_4$, $N_2$, Ar, $H_2S$, COS, $H_2O$, and others. For example, $CO_2$ might arise from combustion of the feedstock during gasification, the concentration of which is increased if the crude syngas steam is subjected to a water-gas shift reaction to convert by reaction with $H_2O$ all or part of the CO in the stream to $CO_2$ and $H_2$. The $H_2S$ arises from the reduction of sulfur present in the feedstock during gasification and from further conversion of other sulfur species in the crude syngas stream to $H_2S$ during the water-gas shift reaction. Due to concerns over greenhouse gas emissions, there is a desire to remove $CO_2$ from syngas prior to its use (e.g. as a combustion fuel). $H_2S$ is also desirably removed from the syngas as it could be a poison for downstream processes, or because if the syngas is combusted in a gas turbine, the $H_2S$ is converted into $SO_2$, which has legal limits on its emission in the combustion exhaust gas.

Therefore, the stream is typically purified by additional processing, for example such processes as shift conversion (full/partial) for removal/reduction of CO content in the mixture, acid gas removal (AGR) by absorption, and final purification of gas mixture to increase recovery or control reaction stoichiometry for the final product. Commercial AGR by absorption processes use a liquid solvent (e.g., Selexol™, Rectisol®, etc.) that removes the $CO_2$ and $H_2S$ from the syngas. If ammonia is the desired end product, an energy intensive $N_2$ wash operation is employed downstream of the AGR to remove impurities from the $H_2$. Due to ecological and environmental regulation, other operations might be required for converting $H_2S$ to elemental sulfur or sulfuric acid and/or for compressing the $CO_2$ for geological storage or enhanced oil recovery (EOR). However, such AGR and additional purification processes are costly (both in terms of capital and operating cost) and require significant power consumption. Thus, there is a need to reduce the overall costs of syngas processing while recovering the highest amount of the desired products as possible.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspect 1. A method comprising:
(a) gasifying a carbonaceous feedstock to form a gasified stream comprising $H_2S$, $CO_2$, CO, and $H_2$;
(b) converting at least a portion of the CO in the gasified stream to $CO_2$ and $H_2$ using a water-gas shift reaction, resulting in a sour syngas stream;
(c) introducing the sour syngas stream into a sour pressure swing adsorption (SPSA) system having a plurality of adsorber beds;
(d) performing a cyclic PSA process using the PSA system comprising the following steps:
(i) pressurizing a first bed of the plurality of adsorber beds to a first pressure;
(ii) feeding the sour syngas stream into an inlet end of the pressurized first bed and discharging a first gas stream from an outlet end of the first bed;
(iii) after the feeding step, introducing a rinse gas into the first bed, the rinse gas being from a source other than directly from another of the plurality of adsorber beds.
(e) removing a product stream from the SPSA system, the product stream having a greater concentration of $H_2$ than the sour syngas stream;
(f) removing a tail gas stream from the SPSA system, the tail gas stream having a greater concentration of $CO_2$ and $H_2S$ than the sour syngas stream; and
(g) separating the tail gas stream into an $H_2S$-enriched stream and a $H_2S$-depleted stream using an acid gas enrichment (AGE) system.

Aspect 2. The method of Aspect 1, wherein step (e) comprises removing a product stream from the SPSA system, the product stream comprising at least 80% $H_2$ and at least 10% $N_2$.

Aspect 3. The method of any of Aspects 1-2, wherein step (a) comprises gasifying a carbonaceous feedstock to form a gasified stream comprising CO, $H_2$, at least 1000 ppm $H_2S$, and at least 20% $CO_2$;

Aspect 4. The method of any of Aspects 2-3, wherein step (d)(iii) comprises introducing a rinse gas comprising at least 99% $N_2$.

Aspect 5. The method of any of Aspects 2-4, further comprising:
(h) synthesizing a reactor product stream comprising at least 10% $NH_3$ from the product stream.

Aspect 6. The method of any of Aspects 1-5, wherein step (d) further comprises:
(iv) reducing the pressure of the first bed to a second pressure by placing the outlet end of the first bed in flow communication with an outlet end of a second bed of the plurality of adsorber beds while performing step (d)(iii).

Aspect 7. The method of Aspect 6, wherein step (d) further comprises:
(v) further reducing the pressure of the first bed to a third pressure by placing the outlet end of the first bed in flow communication with an outlet end of a third bed of the plurality of adsorber beds while performing (d)(iii).

Aspect 8. The method of Aspect 7, wherein step (d) further comprises:
(vi) after performing step (d)(iii) in the first bed, further reducing the pressure of the first bed to a fourth pressure by placing the outlet end of the first bed in flow communication with an outlet end of a fourth bed of the plurality of adsorber beds.

Aspect 9. The method of any of Aspects 1-7, wherein step (e) comprises removing a product stream from the PSA system, the product stream comprising at least 60% $H_2$ and at least 25% CO.

Aspect 10. The method of any of Aspects 1-9, wherein step (d)(iii) comprises introducing a rinse gas comprising at least 85% of one or more selected from the group of $CO_2$ and $H_2S$.

Aspect 11. The method of any of Aspects 1-10, wherein step (d)(iii) comprises after the feeding step, introducing a rinse gas into the inlet end of the first bed, the rinse gas being from a source other than directly from another of the plurality of adsorber beds.

Aspect 12. The method of any of Aspects 1-11, further comprising:
(a) synthesizing a reactor product stream comprising at least 10% MeOH from the product stream.

Aspect 13. The method of any of Aspects 1-12, wherein step (d) further comprises:
(iv). after performing step (d)(iii) in the first bed, reducing the pressure of the first bed to a second pressure by placing the outlet end of the first bed in flow communication with an outlet end of a second bed of the plurality of adsorber beds.

Aspect 14. The method of any of Aspects 1-13, further comprising:
(j) recycling at least a portion of the $H_2S$-depleted stream for pneumatically conveying the carbonaceous feedstock in step (a).

Aspect 15. The method of any of Aspects 1-14, wherein step (g) comprises separating the tail gas stream into an $H_2S$-enriched stream and a $H_2S$-depleted stream using an acid gas enrichment (AGE) system, the $H_2S$-enriched stream comprising at least 5% $H_2S$ and no more than 95% $CO_2$.

Aspect 16. The method of any of Aspects 1-15, further comprising:
(k) converting at least a portion of the H2S-enriched stream to one or more selected from the group of sulfuric acid, elemental sulfur, a product derived from sulfuric acid, and a product derived from elemental sulfur using a sulfur recovery unit.

Aspect 17. The method of any of Aspects 1-16, wherein step (b) comprises converting at least a portion of the CO in the gasified stream to $CO_2$ and $H_2$ using a water-gas shift reaction, resulting in a sour syngas stream comprising at least 0.02% sulfur-containing species and at least 25% $CO_2$.

Aspect 18. The method of any of Aspects 1-17, wherein step (c) comprises introducing the sour syngas stream into a sour pressure swing adsorption (SPSA) system having at least ten adsorber beds.

Aspect 19. The method of any of Aspects 1-18, further comprising:
(l) cooling the sour syngas stream after step (b) and before step (c).

Aspect 20. The method of any of Aspects 1-19, further comprising:
(m) after performing step (b) and before performing step (c), passing the sour syngas stream through a guard bed containing an adsorber adapted to remove organic tar compounds.

BRIEF DESCRIPTION OF SEVERAL VIEWS OF THE DRAWINGS

Other aspects, features, and advantages of the described embodiments will become more fully apparent from the following detailed description, the appended claims, and the accompanying drawings in which like reference numerals identify similar or identical elements.

FIGS. 9A and 9B are a table showing the operation of the 10 bed multi-step SPSA cycle of FIG. 3, indicating the cycle step that is being performed in each bed during each phase of the multi-step SPSA;

FIGS. 10A and 10B are a table showing the operation of the 10 bed multi-step SPSA cycle of FIG. 4, indicating the cycle step that is being performed in each bed during each phase of the multi-step SPSA;

FIGS. 11A and 11B are a table showing the operation of the 10 bed multi-step SPSA cycle of FIG. 5, indicating the cycle step that is being performed in each bed during each phase of the multi-step SPSA;

FIGS. 12A and 12B are a table showing the operation of the 10 bed multi-step SPSA cycle of FIG. 6, indicating the cycle step that is being performed in each bed during each phase of the multi-step SPSA;

FIGS. 13A and 13B are a table showing the operation of the 10 bed multi-step SPSA cycle of FIG. 7, indicating the cycle step that is being performed in each bed during each phase of the multi-step SPSA; and FIGS. 14A and 14B are a table showing the operation of the 10 bed multi-step SPSA cycle of FIG. 8, indicating the cycle step that is being performed in each bed during each phase of the multi-step SPSA.

DETAILED DESCRIPTION OF THE INVENTION

The ensuing detailed description provides preferred exemplary embodiments only, and is not intended to limit the scope, applicability, or configuration of the claimed invention. Rather, the ensuing detailed description of the exemplary embodiments will provide those skilled in the art with an enabling description for implementing the exemplary embodiments of the claimed invention. Various changes may be made in the function and arrangement of elements without departing from the spirit and scope of the invention, as set forth in the appended claims.

Figure 1:
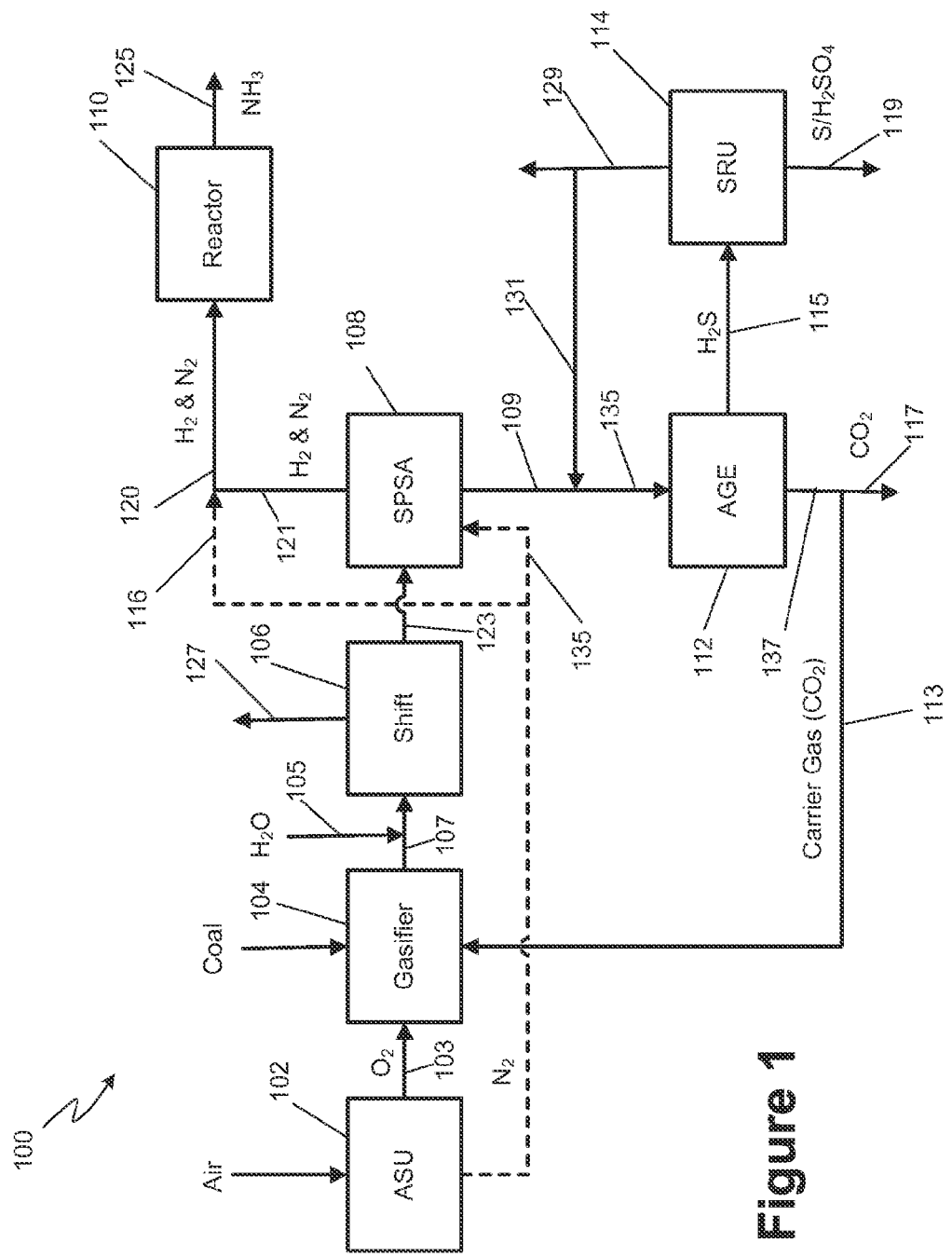
FIG. 1 is a flow diagram for a $NH_3$ synthesis gas production system in accordance with exemplary embodiments.
Figure 2:
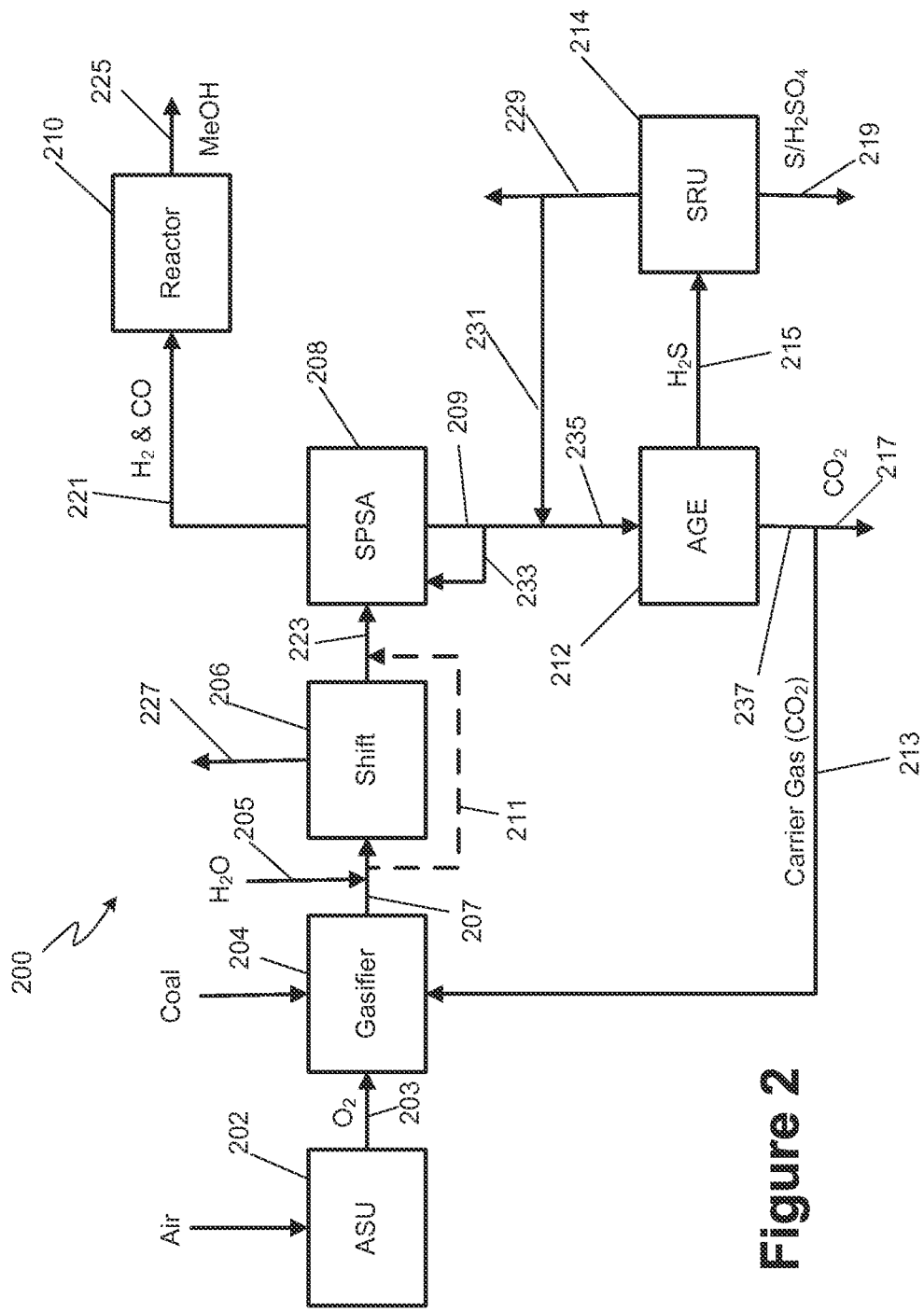
FIG. 2 is a flow diagram for a MeOH synthesis gas production system in accordance with exemplary embodiments.

In FIG. 2, elements that are also present in FIG. 1 are represented by reference numerals differentiated by factors of 100. For example, the air separation unit 102 in system 100 (FIG. 1) corresponds to the air separation unit 202 in system 200 (FIG. 2). Such elements should be regarded as having the same function and features unless otherwise stated or depicted herein, and the discussion of such elements may therefore not be repeated for both embodiments.

Similarly, elements that are present in one or more of the embodiments shown in FIGS. 3 through 8 may be represented by reference numerals differentiated by factors of 100. For example, step 316 of FIG. 3 corresponds to step 416 of FIG. 4. Such elements should be regarded as having the same function and features unless otherwise stated or depicted herein, and the discussion of such elements may therefore not be repeated for multiple embodiments.

The term "conduit," as used in the specification and claims, refers to one or more structures through which fluids can be transported between two or more components of a system. For example, conduits can include pipes, tubes, ducts, passageways, and combinations thereof that transport liquids, vapors, and/or gases.

The term "flow communication," as used in the specification and claims, refers to the nature of connectivity between two or more components that enables liquids, vapors, and/or gases to be transported between the components in a controlled fashion (i.e., without leakage). Coupling two or more components such that they are in flow communication with each other can involve any suitable method known in the art, such as with the use of welds, flanged conduits, gaskets, and bolts. Two or more components may also be coupled together via other components of the system that may separate them.

Unless otherwise specified, any concentration expressed on a percentage (%) basis in the specification and claims should be understood to mean a molar percentage.

Unless otherwise specified, any pressure identified in the application should be understood to mean an absolute pressure and not a gauge pressure.

Directional terms may be used in the specification and claims to describe portions of the present invention (e.g., upper, lower, left, right, etc.). These directional terms are merely intended to assist in describing exemplary embodiments, and are not intended to limit the scope of the claimed invention. In addition, reference numerals that are introduced in the specification in association with a drawing Figure may be repeated in one or more subsequent Figures without additional description in the specification in order to provide context for other features.

Table 1 defines a list of acronyms employed throughout the specification and drawings as an aid to understanding the described embodiments:

TABLE 1

| AGE | Acid Gas Enrichment | AGR | Acid Gas Removal |
|---|---|---|---|
| ASU | Air Separation Unit | CnD | Countercurrent Depressurization |
| D | Depressurization | EQ | Equalization |
| EOR | Enhanced Oil Recovery | F | Feed |
| FP | Feed Pressurization | I | Idle |
| LPS | Low Pressure Steam | LR | Low Pressure Counter-Current Rinse |
| MPS | Medium Pressure Steam | NWU | Nitrogen Wash Unit |
| PU | Purge | PPU | Provide Purge |

TABLE 1-continued

| R | Rinse | RP | Re-Pressurization |
|---|---|---|---|
| SEWGS | Sorption Enhanced Water Gas Shift | SPSA | Sour Pressure Swing Adsorption |
| SRU | Sulfur Recovery Unit | EQiR | Equalization Repressurization where "i" is the Equalization term |
| EQiD | Equalization Depressurization where "i" is the Equalization term | | |

Described embodiments produce syngas mixtures suitable for producing ammonia ($NH_3$) or methanol (MeOH) at high recovery. The sour (sulfur-containing) syngas produced from gasification of solid fuels and shift conversion is charged into a SPSA unit for generating two streams: 1) a primary product (product of interest) stream containing $H_2/N_2$ or $H_2/CO$, and 2) a tail gas stream enriched primarily with $CO_2$ and $H_2S$. A rinse step incorporated in the SPSA cycle sequence allows recovery of substantially all $H_2$ and/or CO by displacing the primary product species from the void space of the bed and adsorbent particles. The tail gas stream from the SPSA unit is treated in an AGE unit to remove the sulfur containing species from the tail gas (typically 0.02 to 10%) and produce a separate high quality gas stream (typically 5 to 40% sulfur containing species) that can be sent directly to a SRU to reject the sulfur species as elemental sulfur or sulfuric acid (and products thereof). A portion of the AGE treated gas stream enriched in $CO_2$ and lacking the sulfur species (typically 10 to 40% of the total $CO_2$ generated by the gasifier) might be used for conveying coal to a gasifier, and the remaining portion might be sent for geological storage, EOR after compression, vented to the atmosphere, or as a reactant or inert in other parts of the process, such as urea production or blanketing.

Described embodiments provide an economically feasible and technically improved process for production of syngas through gasification of solid fuels by replacing the incumbent AGR technology with an SPSA process and an AGE process. Accordingly, the need for a final purification step or steps, as may be required by the conventional process, can be eliminated. Further, an improvement in the SPSA process is made by incorporating a rinse step which aids to improve the recovery and reduce the amount of $H_2$ and/or CO in the tail gas. An enriched $H_2S$ and $CO_2$ stream from the SPSA tail gas can be generated using the rinse process, thus reducing the size of other units (such as the AGE) downstream of the SPSA process.

In the embodiments described below, either an external or internal source of gas stream is used as the rinse gas. In other words, the rinse gas comes from a source other than directly from another adsorber bed. For example, in ammonia syngas production, pure $N_2$ gas (at a purity produced by any commercially acceptable process) produced from an external source might be used. The external source might typically be a cryogenic or pressure swing adsorption plant, nitrogen gas pipeline or a cryogenic liquid nitrogen vaporization system. For MeOH syngas production, an internal or external source of gas stream (e.g., enriched or pure $CO_2$) might be used, where the internal source of gas stream is produced by the SPSA, and the external gas stream source might be delivered from another unit other than the SPSA, for example the AGE unit. In some embodiments, at least a portion of the rinse gas may comprise blow down and purge gas effluents from other adsorber beds that has been compressed before being introduced into the adsorber bed in which the rinse is being performed, and therefore is not obtained directly from another adsorber bed.

The AGE process is used to upgrade the relatively low quality SPSA tail gas by removing the sulfur components and producing an enriched sulfur stream that is subsequently fed to a SRU. The AGE is typically a solvent-based process. Sterically hindered amines, for example FLEXSORB®, are preferred due to their high selectivity for $H_2S$ and low regeneration energy. The treated gas exiting from the AGE unit is an enriched $CO_2$ stream which can be sent for geological storage, EOR application, or vented to the atmosphere, and the enriched $H_2S$ stream (typically between 5-40% purity) is converted to elemental sulfur or sulfuric acid (and products thereof) in the SRU.

Described embodiments therefore provide an SPSA to separate $CO_2$, $H_2S$, and other impurities from a fully- or partially-shifted stream that is generated through the gasification of solid fuels. A rinse step is incorporated in the SPSA cycle to displace the primary products from the interstitial void space of the adsorbent and beds. This helps to intensify the recovery and enrichment of both products produced from the SPSA process. Depending on the product of interest (e.g., $NH_3$ or MeOH), gas from either an external and/or an internal source is used as rinse gas. The AGE process produces an $H_2S$ enriched stream for selective conversion of $H_2S$ into elemental sulfur or sulfuric acid (as well as products thereof) in the SRU unit and a stream that is free of $H_2S$ and consists primarily of $CO_2$. Further, although described herein as being an AGE process, other direct sulfur removal processes might be employed, such as LO-CAT® (from Merichem) or THIOPAQ (from Shell) technology plus a partial condensation process.

FIG. 1 is a flow diagram showing a $NH_3$ synthesis gas production system 100 in accordance with exemplary embodiments of the present invention, and FIG. 2 is a flow diagram showing a syngas production system 200 in accordance with exemplary embodiments of the present invention. The purpose of systems 100,200 is to produce stoichiometric $H_2/N_2$ or $H_2/CO$ mixtures, respectively, for a downstream process from gasification of solid fuels or heavy liquid feedstock (e.g., asphaltenes). Examples of downstream processes are chemical plants (e.g., ammonia, urea, MeOH, or Fischer-Tropsch process) or refineries.

The stream produced in the gasification process (referred to in the claims as a gasified stream) contains impurities, primarily $CO_2$ and sulfur containing species, which must be removed at some stage of the process. Most of the current commercial solutions are absorption-based processes (such as Selexol™ or Rectisol® or their equivalents) that produce separate $CO_2$, $H_2S$, and $H_2$ and/or CO streams. The $H_2S$ stream, which is typically at a purity of from 5-40%, can be sent to an SRU that converts $H_2S$ to elemental sulfur or sulfuric acid (products thereof) and the $CO_2$ stream, which may require further purification before it can be sent for geological storage or EOR application, or released to the atmosphere. The current state-of-the-art technology is capital and energy intensive, and requires significant utility consumption during operation.

Therefore, the present invention focuses on an economically feasible and technically improved process. The goal is achieved through replacing the incumbent AGR technology with an SPSA and an AGE processes. The SPSA process is capable of recovering substantially all of the $H_2$ and/or CO from the feed stream while also removing unwanted species in the product stream (e.g., methane, ethane, ethylene. COS, organic sulfur species).

The flow schemes presented in FIGS. 1 and 2 are preferred embodiments of the present invention. The SPSA unit 108,208 is intended to capture the sour gas species ($H_2S$, $CO_2$) and the majority of other impurities from the gasification process and produce a product stream containing primary product (i.e., the product of interest) at high recovery. Depending on the application, the primary product out of the SPSA may be a high pressure mixture of $H_2/N_2$ (see FIG. 1), $H_2/CO$ (see FIG. 2), or high purity $H_2$. The product stream 121,221 of the SPSA is typically withdrawn at a pressure of 10 to 100 atm and reacted in reactor 110,210 to form a reactor product stream 125,225. In the case of an $NH_3$ synthesis gas production system 100 (FIG. 1), the reactor product stream 125 preferably comprises at least 10% $NH_3$. In the case of a MeOH synthesis gas production system 200 (FIG. 2), the reactor product stream 225 preferably comprises at least 10% MeOH. The tail gas stream 109,209 that is produced by the SPSA unit is sent for further treatment, as will be discussed below.

In each of the flow schemes shown in FIGS. 1 and 2, the respective air separation unit (ASU) 102,202 supplies oxygen to the gasification unit (gasifier) 104,204 via conduit 103,203. It should be noted that an ASU 102,202 is optional and is not required, as oxygen may be supplied to the gasification unit 104,204 from any suitable oxygen source. Such suitable oxygen sources are varied and may be easily identified by persons of skill in the art. As explained herein, an $N_2$-enriched stream may optionally be withdrawn from the ASU 102,202 and mixed with a product stream 121 from an SPSA 108,208 and/or used as a rinse gas in the SPSA 108,208.

Since the SPSA process is intended to purify the synthesis gas, the choice of gasification technology and feedstock is not as relevant as the characteristics of the raw synthesis gas it produces. Thus, the design of the systems 100,200 are based on the major impurities present in the synthesis gas, namely $H_2S$, $CO_2$, COS, and HCN, as well as impurities such as $N_2$, Ar, $CH_4$, metal carbonyls, and higher hydrocarbons. Accordingly, both dry- and slurry-fed entrained flow gasification technologies can be used. The raw synthesis gas from the gasification unit 104,204 can be delivered to a sour shift reactor 106,206 via conduit 107,207, fully or partially shifted in the sour shift reactor 106,206, and then cooled to SPSA process conditions (nominally to 100 degrees F./38 degrees C.). Condensable species, including water, organic tar species such as benzene, naphthalene, and other aromatic and polyaromatic species, are removed from the gas stream (represented by conduit 127,227). Stream 123,223 can contain anywhere from less than 0.02% to 3% $H_2S$ and typically greater than 25% $CO_2$.

Depending on the level of impurities or known poisons, like tars from low temperature fixed or fluidized beds or compounds like HF that are known to degrade the adsorbent material, a TSA or guard bed may be used upstream of the SPSA inlet (not shown). The guard bed would contain adsorbents with an affinity for the impurities or known poisons. It could be operated until the adsorbent is saturated, with subsequent disposal of the spent adsorbent, or it could consist of a regenerable system where the spent adsorbent is regenerated (e.g, via hot gas in a temperature swing adsorption (TSA) process). In the present flow scheme arrangements shown in FIGS. 1 and 2, no further downstream processing steps are required to produce the purified primary product stream. For example, in the $NH_3$ synthesis gas production system 100 shown in FIG. 1, no downstream purification unit (such as an NWU) is necessary to produce $NH_3$ synthesis gas product at high purity.

Figure 3:
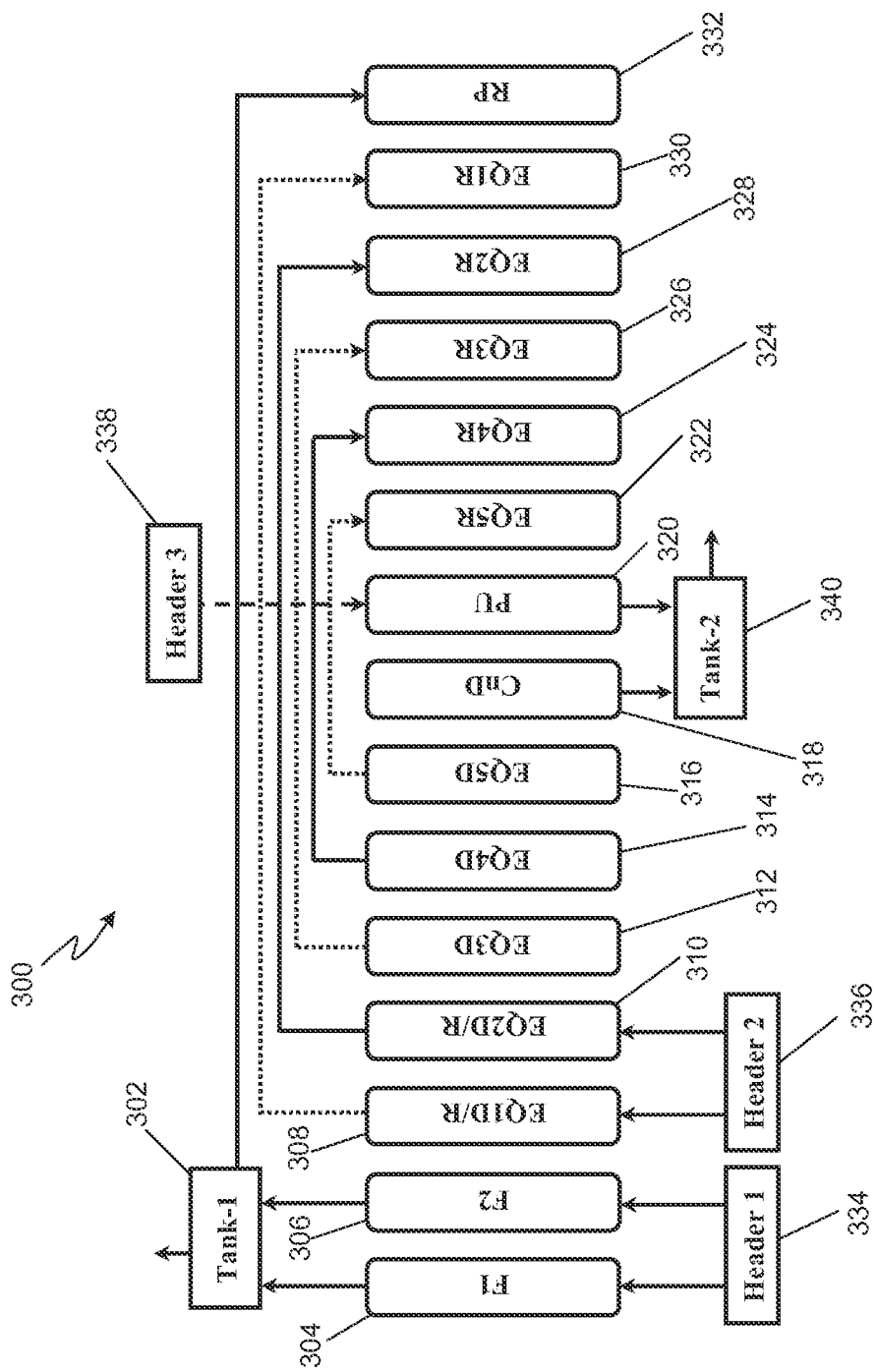
FIG. 3 is a block diagram showing a 10 bed multi-step Sour Pressure Swing Adsorption (SPSA) cycle for $NH_3$ synthesis gas production having a high/intermediate pressure co-current light rinse cycle in a 10/2/5 configuration in accordance with exemplary embodiments.

With regard to the NH$_3$ synthesis gas production application system 100 (flow diagram shown in FIG. 1), the SPSA cycle 300 shown in FIG. 3 is preferably used. The SPSA cycle 300 is a 10/2/5 configuration (10-bed process/2 beds on feed/5 equalization steps). In this embodiment, each bed undergoes a cyclic sequence of adsorption (feed), rinse, pressure equalization, desorption, purge and other complementary steps, as will be described in further detail below.

Each bed preferably contains multiple layers of adsorbents for selective removal of H$_2$S, CO$_2$, CO, and CH$_4$. Preferably, three layers of adsorbents are provided in each bed. Preferably, the adsorbents are chosen from X or Y or A type zeolite, silica gel, activated carbon, or activated alumina, but other adsorbents are suitable within the scope of this invention. The rinse step (also known as a light rinse in the embodiment) that is incorporated into the cycle enhances the recovery of the H$_2$ (i.e., greater than 97% of the H$_2$) by displacing the light (i.e., less selectively adsorbed) components from the bed. This rinse step is coupled with depressurization equalization steps 1 and 2 (EQ1D/R 308 and EQ2D/R 310, see FIG. 3) upon completion of the feed step (F1 304 and F2 306 in FIG. 3). The depressurized gas from these steps is sent to another bed (bed EQ1R 330 and bed EQ2R 328, respectively) for re-pressurization. Thereby, any light gas (H$_2$ in this case) remaining in the inter- and intra-particle void spaces is recovered. The rinse gas (consisting of N$_2$ with preferably less than 100 ppm impurities and, more preferably, <1 ppm impurities) that has been collected from an external source remains in the SPSA primary product, to which a small amount of make-up N$_2$ (represented in FIG. 1 by conduit 116) can be added to stream 121 to attain a suitable stoichiometric proportion of H$_2$ to N$_2$ (i.e., 3 to 1) before sending to a NH$_3$ synthesis plant/reactor 110 via conduit 120.

Figure 4:
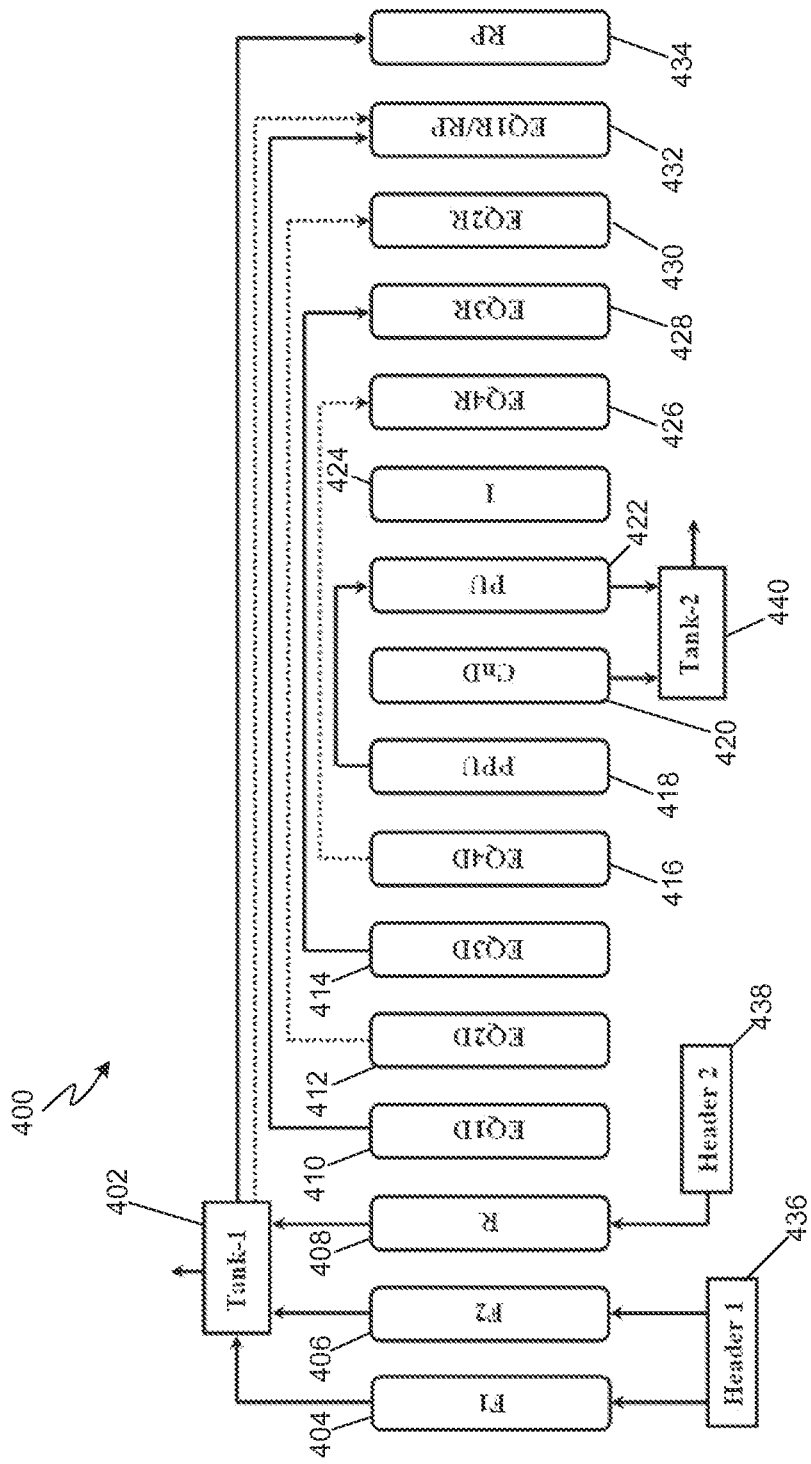
FIG. 4 is a block diagram showing a 10 bed multi-step SPSA cycle for MeOH synthesis gas production having a high pressure heavy rinse cycle in a 10/2/4 configuration in accordance with exemplary embodiments.

For a syngas production application (see FIG. 2), a 10/2/4 (10-bed process/2 beds on feed/4 equalization steps) cycle schedule, such as the SPSA cycle 400 shown in FIG. 4, can be used (although other cycle schedules could be used in alternate embodiments, as would be appreciated by one having ordinary skill in the art). In this embodiment, the SPSA cycle 400 utilizes a heavy rinse step 408 (i.e., a rinse using more strongly adsorbed species), which is the key to recovering the maximum amount of H$_2$ and CO while simultaneously enriching the heavy components (i.e., CO$_2$ and/or H$_2$S) in the tail gas stream 209. This step is carried out with substantially pure or enriched heavy component (94 to 100% CO$_2$ and/or 0 to 3% H$_2$S) that has been collected either from an external source (e.g., from another unit operation) or from an internal source (e.g., the heavy component has been generated during the operation of the SPSA process). This step drives out the co-adsorbed and residual less-strongly-adsorbed species from inter- and intra-particle void spaces of the adsorbents so that the free volume is mostly replaced by the heavy components (i.e., CO$_2$ and/or H$_2$S). This operation helps to sharpen the mass transfer front of the heavy components, thereby intensifying the enrichment and recovery of both light and heavy components. In this embodiment portrayed in FIGS. 2 and 4, the bed contains a single layer of adsorbent for selective removal of primarily H$_2$S and CO$_2$. Preferably, the adsorbents are chosen from X or Y or A type zeolite, silica gel, activated carbon, or activated alumina, but other adsorbents are suitable within the scope of this invention.

The SPSA 108, 208 rejects the impurities into a single tail gas stream 109,209. Nominally, the tail gas stream 109,209 contains almost all the CO$_2$ (preferably at least 80%), all the H$_2$S (preferably at least 95% and, more preferably, at least 99% of the H$_2$S present in the input stream 123, 223), COS, and other minor impurities along with some H$_2$ and/or CO products. The use of upstream reaction steps (not shown in the Figures) can reduce the COS in the syngas. For example, a COS hydrolysis unit could be used to convert COS to H$_2$S through the following reaction: COS+H$_2$O->H$_2$S+CO$_2$.

Due to stringent environmental regulations, the tail gas stream 109,209 cannot be vented as produced and further processing is required to remove the sulfur compounds. This is done by using the AGE unit 112,212 shown in FIGS. 1 and 2. AGE technologies are commercially available, and the preferred technology in the current embodiment is a highly-selective H$_2$S solvent, such as the FLEXSORB® SE or SE Plus solvent produced by ExxonMobil; Sulfinol®, SulFerox, THIOPAQ and ADIP® produced by Shell; or UCARSOL™ produced by Dow Chemical. The treated gas stream 137,237 exiting the AGE 112,212 is an H$_2$S depleted stream which can be sent for geological storage or EOR application, or vented to the atmosphere (stream 117,217). The enriched H$_2$S stream 115,215 (containing 5 to 40% H$_2$S) is converted to elemental sulfur or sulfuric acid (and products thereof) in the SRU 114,214 and discharged therefrom via stream 119,219. A stream 129,229 comprising unreacted H$_2$S and SO$_2$, is also discharged from the SRU. Depending upon its composition, stream 129,229 may be vented to the atmosphere, recycled (stream 131,231) to the AGE, or further processed before being vented to the atmosphere or internally recycled. In the event that stream 129,229 is recycled, it is combined with stream 109,209 to form stream 135,235 before being introduced into the AGE 112.

To summarize, significant steps in the process include: (1) a PSA (sour PSA or SPSA) 108,208 to adsorb and remove H$_2$S and CO$_2$ from an input stream 123,223 containing H$_2$S, CO$_2$, H$_2$, CO, and other impurities; (2) depending on the product of interest from the SPSA process, a high pressure co-current light/heavy rinse step that has been incorporated in the system 100,200 to intensify the recovery of H$_2$ or H$_2$ and CO; (3) an external source of gas stream containing N$_2$ (at a purity produced by any commercially acceptable process) that is used for the light rinse step for NH$_3$ synthesis gas production application (the external source may comprise a cryogenic/pressure swing adsorption plant, nitrogen gas pipeline or a cryogenic liquid nitrogen vaporization system); (4) for NH$_3$ synthesis gas production application, a rinse step that has been coupled with first and second depressurization equalization steps upon completion of the feed step; (5) for NH$_3$ synthesis gas production application, a small amount of make-up N$_2$ (stream 116) can optionally be added to attain a suitable stoichiometric proportion of H$_2$ to N$_2$ (3 to 1) before sending to an ammonia synthesis plant; and (6) for a syngas production application, an internal or external source of gas stream 1 (e.g., enriched or pure CO$_2$). In the present embodiment, the internal source of gas stream 233 is produced by the SPSA 108,208 itself and the external gas stream source may comprise another unit operation other than the SPSA such as an AGE unit 112,212. For both options, a compressor (not shown) may be required to provide the gas at a high feed pressure.

The following points are pertinent for the syngas source: (a) will normally be obtained from gasification of solid feedstocks, e.g., coal, pet coke, biomass, and/or municipal waste; (b) optionally, a dry or slurry feed entrained flow gasification technology can be used to produce synthesis gases, preferably having an operating pressure range of 10 to 100 atm; (c) for MeOH synthesis gas production applications, the composition of the gas stream reaching the SPSA unit 208 can be controlled by bypassing a stream 211 around a sour shift reactor. This helps to produce a synthesis gas stream from the SPSA process at desired stoichiometric proportions; (d) other components such as $CH_4$, $N_2$ and Ar may be present. For $NH_3$ synthesis gas production application, $N_2$ and Ar typically remain with the primary product and $CH_4$ is mostly retained by the SPSA process; (e) an additional cooling step will preferably be incorporated to produce SPSA feed gas stream at 80 to 120 degrees F. (27 to 49 degrees C.); (f) a water wash step (see water streams 105, 205) can optionally be employed to reject the majority of particulates and soluble species such as $NH_3$, HCl from the SPSA feed gas; (g) an upstream reaction can optionally be employed to reduce the COS in the synthesis gas; and (h) tar species can optionally be rejected upstream using a guard bed.

Product uses from the SPSA unit 108, 208 include: (a) for $NH_3$ synthesis gas production applications, the product from the SPSA unit preferably contains a mixture of $H_2$ and $N_2$ with a molar ratio greater than or equal to 3. An additional amount of $N_2$ may need to be added to the SPSA product before it is sent to an ammonia synthesis plant to achieve the desired $H_2/N_2$ ratio. The product preferably contains <2.0 ppm CO and <0.1 ppm sulfur containing species (e.g., $H_2S$ and COS); (b) for syngas production applications, synthesis gas is produced with the desired $H_2/CO$ stoichiometric proportion; (c) the SPSA feed gas concentration can be controlled to produce a primary product stream with a different $H_2/CO$ ratio in order to generate synthesis gas for other chemical process applications (such as a Fischer-Tropsch, DME, ethanol, SNG process); (d) $H_2$ can also be produced at sufficient purity and recovery in order to use the $H_2$ for gas turbine fuel, refinery and other chemical applications; (e) the tail gas streams 109,209 from the SPSA unit 108,208 can be separated and enriched to certain $H_2S$ concentrations 5 to 40%) for producing elemental sulfur or sulfuric acid (and products thereof). The AGE unit 112,212 and SRU 114,214 are employed for this purpose; (f) the AGE unit 112,212 also produces an enriched $CO_2$ stream (see treated gas stream 137,237) that can be used for carbon sequestration, an EOR application, for chemical feedstock to other processes (e.g., urea manufacturing), for blanketing of coal or other blanketing applications, or simply vented to the atmosphere. Optionally, at least a portion 113,213 of the enriched $CO_2$ stream 137,237 can be used as a carrier gas in the gasifier 104,204 to convey pulverized coal.

The SPSA unit 108,208 can be designed with all known features and configurations typical for $H_2$ PSA (feed, equalization, depressurization, purge, re-pressurization, etc.). The SPSA technology is differentiated from the typical $H_2$ PSA process in a number of ways, specifically: (a) high levels of sulfur containing species (e.g., $H_2S$ or COS) are provided in the feed gas; (b) a high percentage of $CO_2$ (e.g., greater than 25% $CO_2$) is present in the feed that needs to be adsorbed; (c) many possible trace components, depending on feedstock and gasifier type and/or operation, are present that could damage the adsorbent over time; and (d) there is the potential for cases where both $H_2$ and CO, or $H_2$ and $N_2$, are produced rather than just $H_2$.

The SPSA unit 108,208 also includes a rinse step incorporated into the cycle configuration for enhancing the enrichment and recovery of heavy (i.e., more strongly adsorbed) and light (i.e., less strongly adsorbed) components. Further, depending on the particular product of interest, different types of rinse (i.e., light rinse versus heavy rinse) can be employed. For $NH_3$ synthesis gas production applications, light rinse gas, containing $N_2$ of a purity produced by any commercially acceptable process, from an external source is used.

The rinse cycle design shown in FIG. 3 is the preferred option for the system 100 of FIG. 1, though many other rinse cycle designs can be employed. Exemplary alternate embodiments of the rinse cycle design are presented in FIGS. 5-8. These process cycle variations are described in more detail in the following paragraphs.

In FIG. 3, the rinse step is coupled with equalization depressurization steps 1 and 2 (EQ1D/R 308 and EQ2D/R 310) upon completion of feed step F1 304, F2 306. The gases exiting from the beds undergoing steps EQ1D/R 308 and EQ2D/R 310 are used to re-pressurize other beds undergoing equalization re-pressurization steps EQ1R 330 and EQ2R 328, respectively. The rinse gas is charged co-currently at intermediate to high pressure (for example, 10-100 atm). For purposes of this application, a co-current flow means a flow that is in the same direction as the flow of the feed gas and counter current flow means a flow that is in the opposite direction from the flow of the feed gas. During purge (PU) step 320, a low pressure $N_2$ gas (at a purity provided by any commercially acceptable process) is supplied counter-currently to regenerate the bed (at step 320).

FIG. 3 also shows gas transfer during EQ3D 312, EQ4D 314 and EQ5D 316 through the top (product) end of the adsorber beds. Alternatively, transfer of equalization gas through the bottom (feed) end of the adsorber bed (not shown) may also be used as an effective means of pressure equalization. Transfer of equalization gas through the bottom of the adsorber bed could be used instead of top equalization or simultaneously with top equalization.

The 10-bed multi-step SPSA cycle 300 of FIG. 3 is shown in an alternative format in the table of FIGS. 9A and 9B, in which each cell of the table identifies a particular cycle step performed in one of the beds during each phase of the multi-step SPSA cycle 300. In this table, the acronyms shown refer to the following cycle steps: F (F1 or F2)=feed; EQ1D/R=top equalization depressurization 1 with rinse; EQ2D/R =top equalization depressurization 2 with rinse; EQ3D=top equalization depressurization 3; EQ4D=top equalization depressurization 4; EQ5D=top equalization depressurization 5; CnD=counter-current depressurization; PU=$N_2$ purge; EQ5R=top equalization re-pressurization 5; EQ4R=top equalization re-pressurization 4; EQ3R=top equalization re-pressurization 3; EQ2R=top equalization re-pressurization 2; EQ1R=top equalization re-pressurization 1; and RP=product re-pressurization.

Each of these SPSA cycle steps for $NH_3$ synthesis gas production will now be described below in further detail.
(1) Feed step (F1 and F2): assuming that the bed has been previously pressurized to the highest pressure level of the cycle with primary product gas (mixture of $N_2$ and $H_2$), the feed gas mixture is introduced to the inlet end of the bed and the less-adsorbed gas ($H_2$ and $N_2$) is discharged from the outlet end of the bed. The feed step is continued until the mass transfer zone (MTZ) of the preferentially adsorbed component approaches the exit end of the bed without substantially breaking through it.
(2) Top equalization depressurization 1 with rinse step (EQ1D/R): At the termination of the feed step, the first bed is connected with another bed undergoing step EQ1R (described below) and a portion of the void as well as desorbed gas is transferred from the product end of the first bed to the product end of another bed (that is undergoing step EQ1R), thus lowering the bed pressure of the first bed to an intermediate level. Simultaneously, a rinse gas containing $N_2$ from an external source (i.e., a source other than directly from another adsorber bed) is charged to the feed end of the first bed. Being a less selectively adsorbed (light) species, the rinse gas assists to displace inter- and intra-particle void gases from the bed, thereby aiding to improve the recovery of $H_2$ and furnishing the $N_2$ requirement (to some extent) for ammonia synthesis gas produced from the SPSA process.

(3) Top equalization depressurization 2 with rinse step (EQ2D/R): Following step 2, the first bed is connected with another bed undergoing step EQ2R through the product ends while simultaneously providing rinse gas to the feed end of the first bed. During the course of this step, more co-adsorbed and void gases are removed and the pressure of the first bed drops to another intermediate level.

(4) Top equalization depressurization step 3 (EQ3D): The first bed is again depressurized to another intermediate pressure level by connecting it with another bed undergoing step EQ3R, and the effluent-containing void as well as desorbed gases are dumped into another bed through the product end of the first bed. No additional rinse gas is supplied during this period of operation.

(5) Top equalization depressurization step 4 (EQ4D): In this step, the pressure in the first bed is further lowered to another intermediate level by transferring void and desorbed gases to another bed undergoing step EQ4R. The pressure transfer again is conducted through the product end of the first bed.

(6) Top equalization depressurization step 5 (EQ5D): In similar fashion as described with respect to step (5), above, the pressure of the first bed is further reduced and the light gases (if any), along with some desorbed gas, are transferred to another bed undergoing step EQ5R.

(7) Counter-current depressurization (CnD): After step (6), the first bed is depressurized through the feed end (counter-currently) to at or near ambient pressure level. The effluent enriched in the more selectively adsorbed species ($CO_2$ and $H_2S$) is withdrawn as secondary product.

(8) Purge step (PU): Upon termination of the CnD step, purge gas containing $N_2$ (at a purity produced by any commercially acceptable process) from an external source is introduced to the product end of the first bed and the effluent is collected as a secondary product from the feed end of the first bed at essentially ambient pressure.

(9) Top equalization re-pressurization step 5 (EQ5R): Following the PU step, the pressure of the first bed is brought back to an intermediate level from ambient pressure by introducing the void as well as desorbed gases from another bed undergoing EQ5D.

(10) Top equalization re-pressurization step 4 (EQ4R): Following step (9), the pressure of the first bed is brought back to another intermediate level by introducing the void as well as desorbed gases from another bed undergoing EQ4D.

(11) Top equalization re-pressurization step 3 (EQ3R): Following step (10), the pressure of the first bed is brought back to another intermediate level by introducing the void as well as desorbed gases from another bed undergoing EQ3D.

(12) Top equalization re-pressurization step 2 (EQ2R): Following step (11), the pressure of the first bed is brought back to another intermediate level by introducing the void as well as desorbed gases from another bed undergoing EQ2D/R.

(13) Top equalization re-pressurization step 1 (EQ1R): Following step (12), the pressure of the first bed is brought back to another intermediate level by introducing the void as well as desorbed gases from another bed undergoing EQ1D/R.

(14) Product re-pressurization step (RP): Finally, the pressure of the first bed is brought back to the feed pressure level. The RP step is initiated through introducing part of the primary product (containing a mixture of $N_2$ and $H_2$) that is produced during the feed step into the bed. At the end of this step the process cycle has completed and the sequence is started again from step 1.

A similar process cycle is executed for each of the other remaining beds, however the timing of each is staggered so the entire set of process steps correspond that shown in FIGS. 9A and 9B. As is well known by those skilled in the art, it is also possible to inject idle periods within the cycle table to change the duration of individual process steps.

Figure 5:
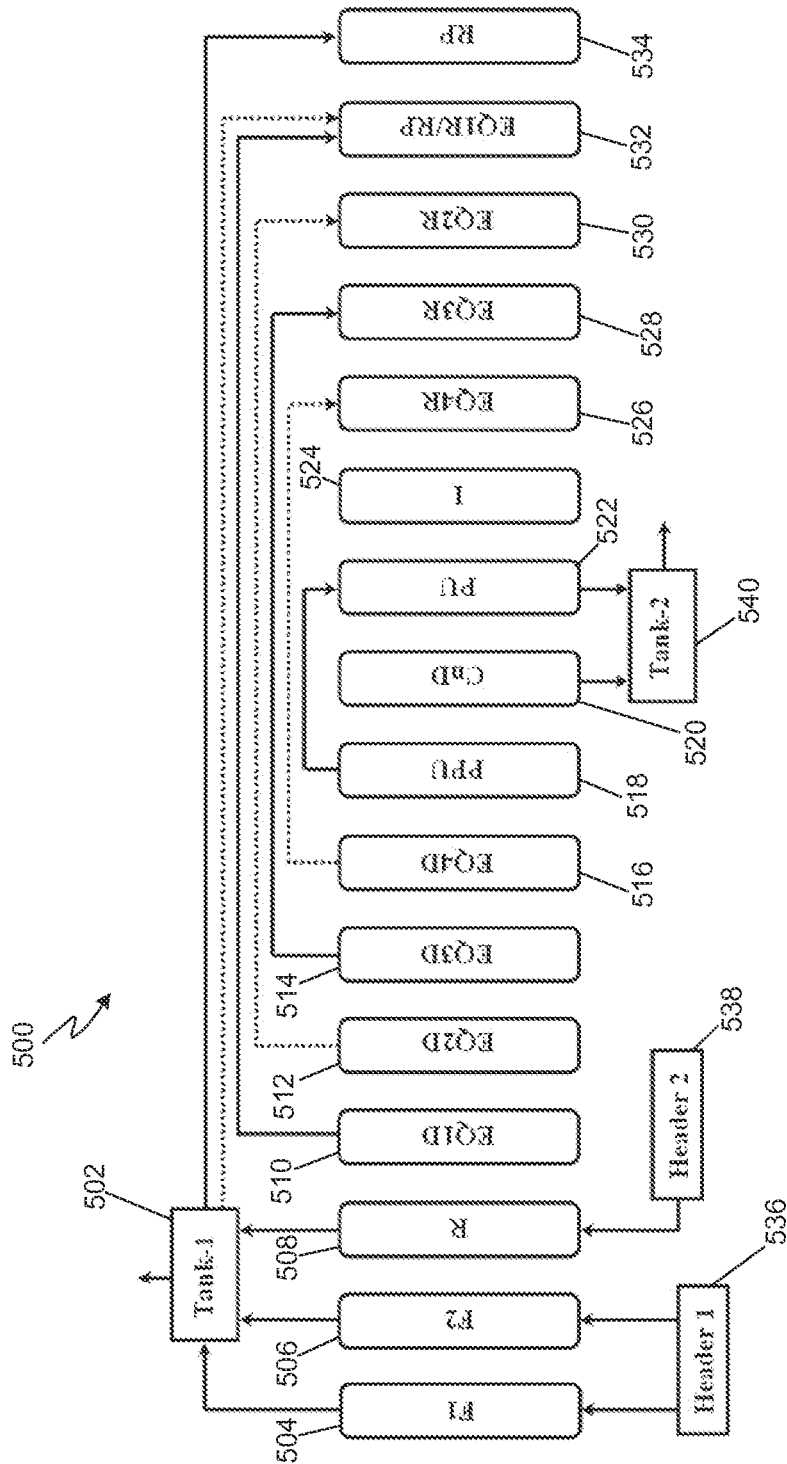
FIG. 5 is a block diagram showing a 10 bed multi-step SPSA cycle for $NH_3$ synthesis gas production having a high pressure co-current light rinse cycle in a 10/2/4 configuration in accordance with exemplary embodiments.

FIG. 5 shows an alternate embodiment of an SPSA cycle 500. In this embodiment, rinse step 508 is initiated upon completion of feed step 504,506 and prior to starting the equalization depressurization steps EQ1D 510, EQ2D 512, EQ3D 514, and EQ4D 516. A co-current high pressure rinse gas is charged at the feed end of the first bed and the product from the rinse step 508 is mixed with primary product. During purge (PU) step 522, gas from another bed undergoing PPU (provide purge) step 518 is used rather than using $N_2$ from an external source.

The operation of the 10-bed multi-step SPSA cycle 500 of FIG. 5 is shown in the table of FIGS. 11A and 11B, in which the cycle step that is being performed in each bed during each phase of the multi-step SPSA cycle is shown. In this table, the acronyms shown refer to the following cycle steps: F (F1 or F2)=feed; R=rinse (high pressure co-current $N_2$ rinse); EQ1D=top equalization depressurization 1; EQ2D=top equalization depressurization 2; EQ3D=top equalization depressurization 3; EQ4D=top equalization depressurization 4; PPU=provide product purge; CnD=counter-current depressurization; PU=product purge; I=idle; EQ4R=top equalization re-pressurization 4; EQ3R=top equalization re-pressurization 3; EQ2R=top equalization re-pressurization 2; EQ1R=top equalization re-pressurization 1; and RP=product re-pressurization.

Figure 6:
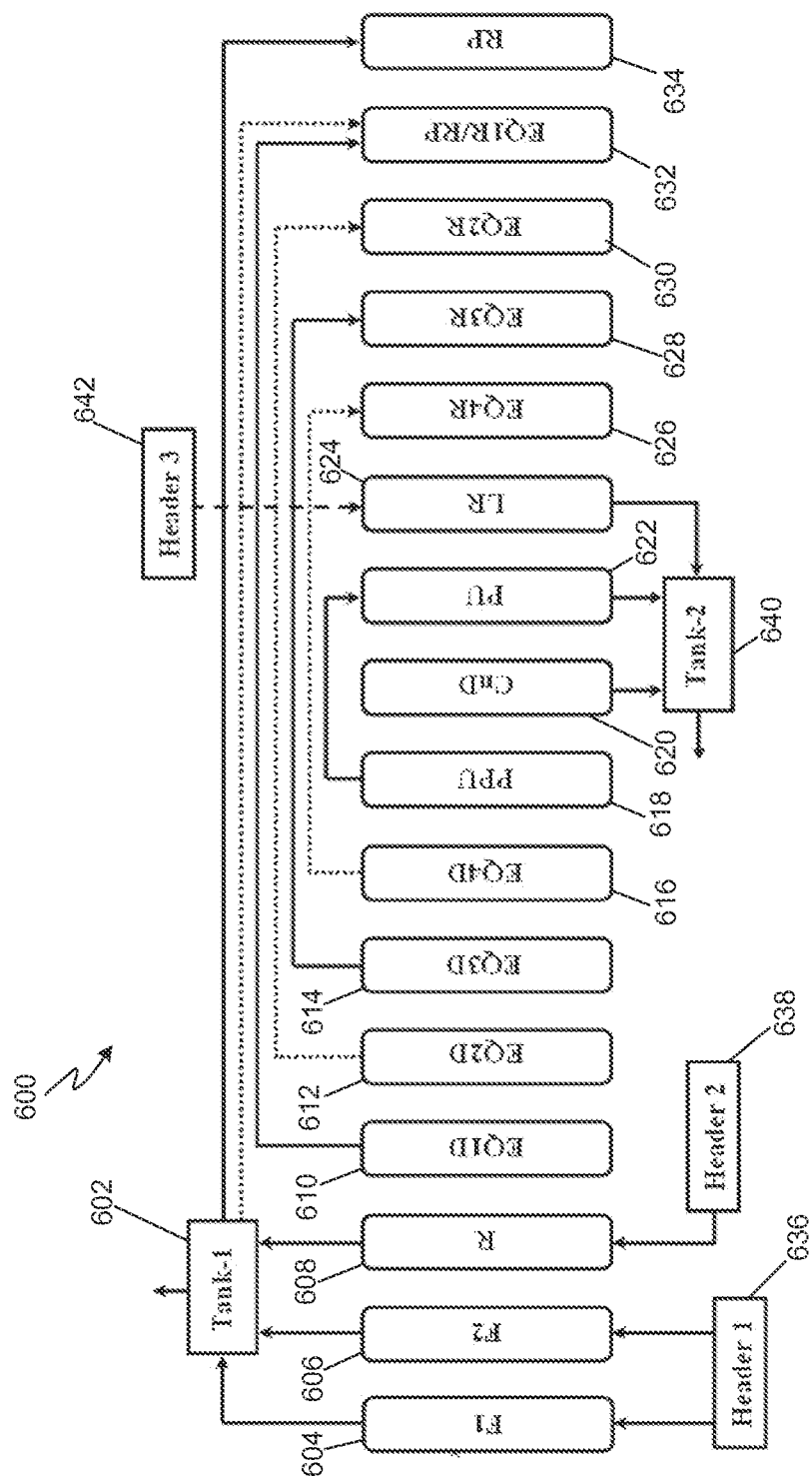
FIG. 6 is a block diagram showing a 10 bed multi-step SPSA cycle for $NH_3$ synthesis gas production having a high/low pressure co-current/counter-current light rinse cycle in a 10/2/4 configuration in accordance with exemplary embodiments.

FIG. 6 shows another alternate embodiment of an SPSA cycle 600. The rinse design presented in FIG. 6 is very similar to the one shown in FIG. 5 except that additional low pressure $N_2$ gas is provided counter-currently to regenerate the bed further during LR step 624. The table of FIGS. 12A and 12B shows the operation of the 10-bed multi-step SPSA cycle 600 of FIG. 6. In this table, all shared acronyms refer to the cycle steps as defined above with respect to FIGS. 11A and 11B, except that in FIGS. 11A and 11B, "LR" means a low pressure $N_2$ rinse.

Figure 7:
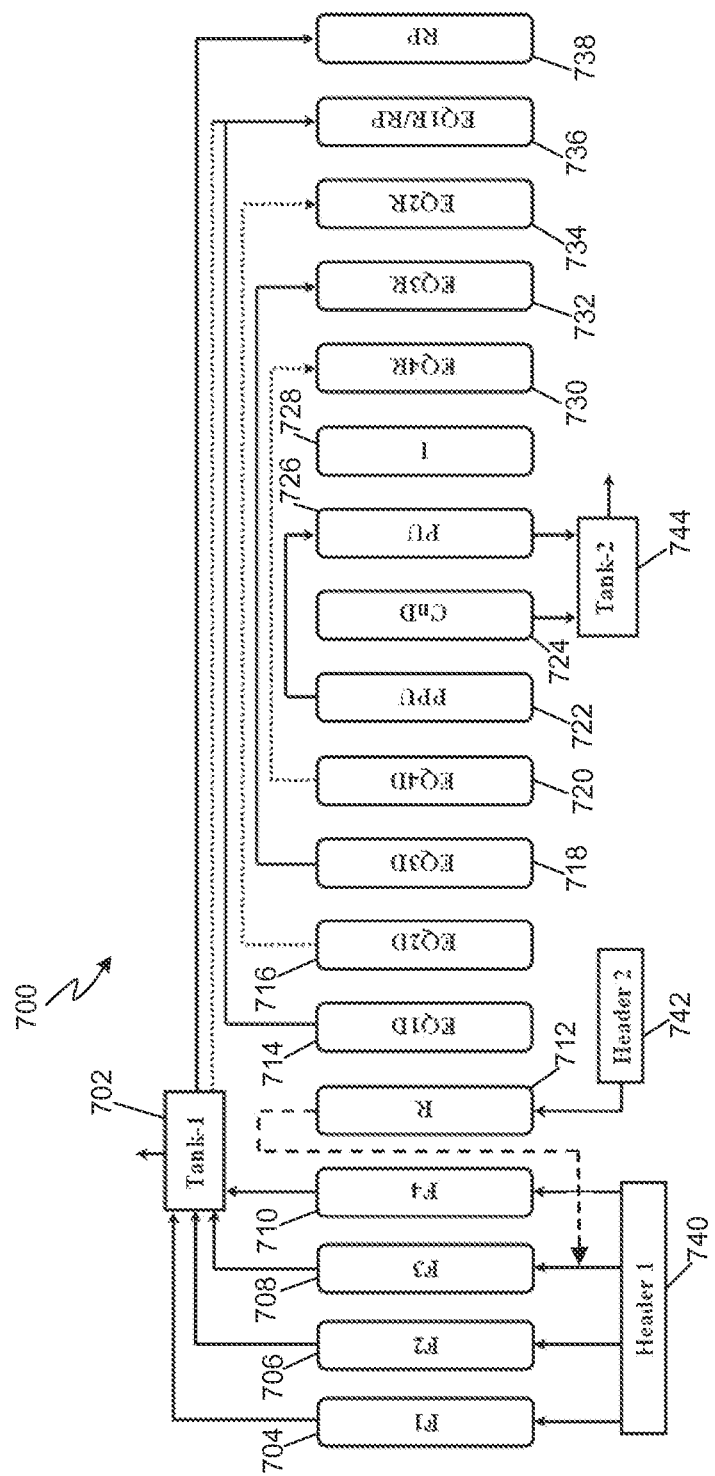
FIG. 7 is a block diagram showing a 10 bed multi-step SPSA cycle for $NH_3$ synthesis gas production having a high pressure co-current light rinse cycle in a 10/2/4 configuration in accordance with exemplary embodiments.

FIG. 7 shows an alternate embodiment of a rinse design 700. The rinse design 700 in FIG. 7 is similar to the one shown in FIG. 5 except that the product from rinse step (R) 712 is mixed with feed step F3 708. The table of FIGS. 13A and 13B shows the operation of the 10-bed multi-step SPSA cycle 700 of FIG. 7. In this table, all shared acronyms refer to the cycle steps as defined above with respect to FIGS. 11A and 11B.

Figure 8:
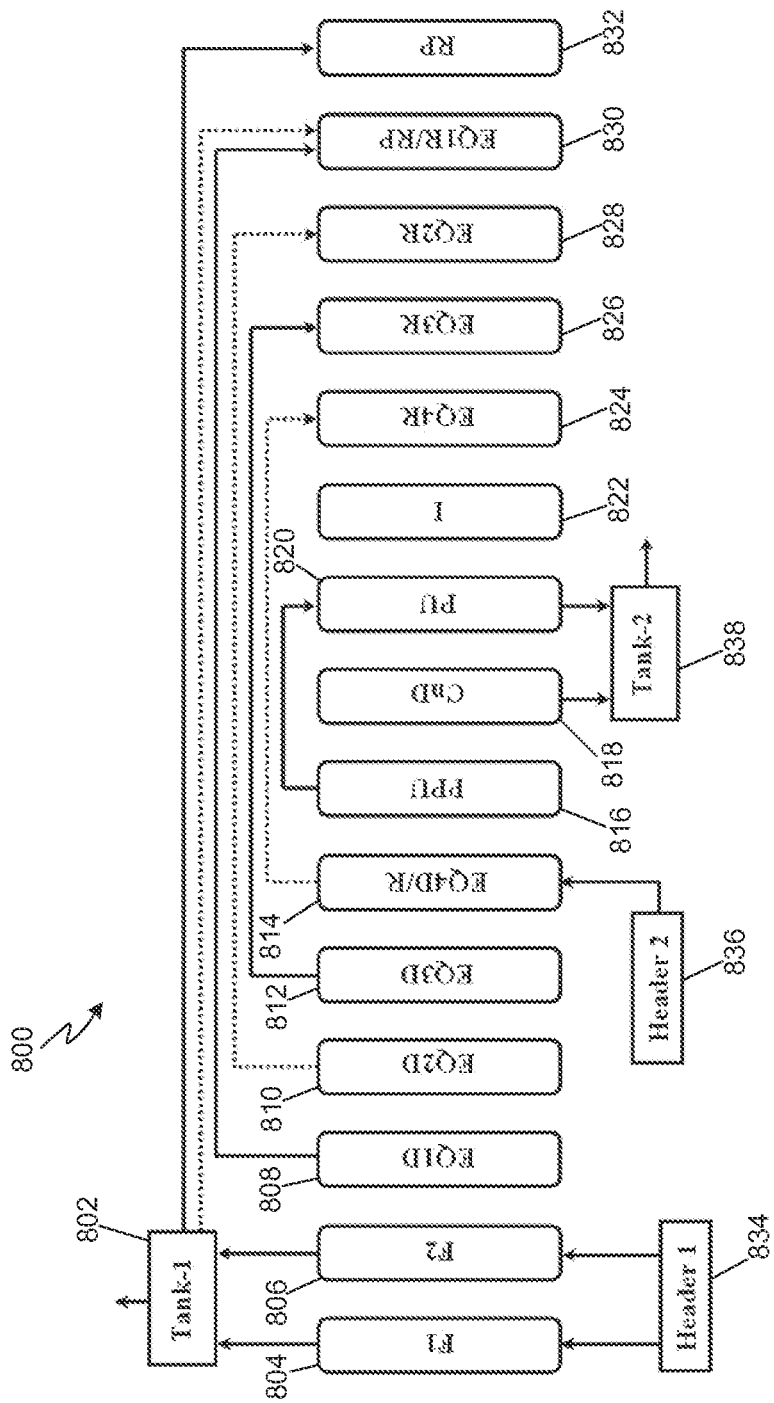

FIG. 8 shows an alternate embodiment of a rinse design 800. In this embodiment, the rinse step R is incorporated with the last equalization depressurization step (EQ4D/R 814) co-currently at intermediate pressure. The gas from this step is used to re-pressurize the bed undergoing equalization re-pressurization step (EQ4R 824). The table of FIGS. 14A and 14B shows the operation of the 10-bed multi-step SPSA cycle 800 of FIG. 8. In this table, all shared acronyms refer to the cycle steps as defined above with respect to FIGS. 11A and 11B.

All of the exemplary embodiments described herein are based on a 10-bed process. In alternate embodiments according to the present invention, a greater or fewer number of beds could be used, as would be appreciated by one having ordinary skill in the art.

The $N_2$ stream used as the rinse gas remains in the primary product. Additional $N_2$ may be added (represented by stream 116 in FIG. 1) to maintain a suitable stoichiometric mixture of $H_2$ to $N_2$ before sending the gas to an ammonia synthesis plant (represented by reactor 110 in FIG. 1).

For a syngas production application 200 (see FIG. 2), a high pressure co-current heavy rinse is used. In this embodiment, MeOH is nominally used as an example of a particular syngas production application. The rinse gas consists of enriched heavy component(s) (e.g., $CO_2$ and/or $H_2S$). The preferred cycle configuration for this system 200 is shown in FIG. 4. In this embodiment, the rinse step 408 is a separate step and the product from this step is mixed with primary products. It should be understood that alternate embodiments of the cycle configuration are possible within the scope of this invention. Gas from either an internal or external source can be used. The internal source of the gas stream the SPSA 208 itself and the external gas stream source may comprise another unit operation other than the SPSA 208.

Each of these SPSA cycle steps for MeOH synthesis gas production will now be described below in further detail.

(1) Feed step (F1 and F2): Assuming that the first bed has been previously pressurized to the highest pressure level of the cycle with primary product gas ($H_2$ and CO), the feed gas mixture is introduced to the inlet end of the first bed and the less-adsorbed gas ($H_2$ and CO) is discharged from the outlet end of first bed. The feed step is continued until the mass transfer zone (MTZ) of a preferentially adsorbed component approaches the exit end of the bed without substantially breaking through it.

(2) Heavy rinse (R): After the feed step, an enriched heavy gas stream is passed through the first bed in the same direction as the feed flow (co-current) at feed pressure. The effluent from the first bed containing primarily $H_2$ and CO is mixed with primary product. The rinse step is carried out with a pure or enriched heavy component ($CO_2$ and/or $H_2S$) that is collected either from an external source or from another unit operation, or that is generated during the operation of the PSA process. This step drives out the co-adsorbed and residual less-strongly-adsorbed species from inter- and intra-particle void spaces of adsorbents so that the free volume is mostly replaced by the heavy components.

(3) Top equalization depressurization step 1 (EQ1D): At the termination of the rinse step, the first bed is connected with another bed undergoing step EQ1R/RP (further described below) and a portion of the void as well as desorbed gas is transferred from the product end of the first bed to the product end of another bed (that is undergoing step EQ1R/RP), thus lowering the bed pressure of the first bed to an intermediate level.

(4) Top equalization depressurization step 2 (EQ2D): Following step (3), the first bed is connected with another bed undergoing step EQ2R through the product end of the bed. During this step, more co-adsorbed and void gases are removed and the bed pressure of the first bed drops to another intermediate level.

(5) Top equalization depressurization step 3 (EQ3D): The first bed is again depressurized to another intermediate pressure level by connecting it with another bed undergoing step EQ3R and the effluent containing void as well as desorbed gases are transferred into another bed through its product end.

(6) Top equalization depressurization step 4 (EQ4D): According to this mode of operation, the pressure in the first bed is further lowered to another intermediate level by transferring void and desorbed gases to another bed undergoing step EQ4R. The pressure transfer again is conducted through the product end of the first bed.

(7) Provide product purge step (PPU): During this mode of operation, the bed pressure of the first bed is further reduced and the light gases (if any) along with some desorbed gas are transferred to another bed undergoing purge (PU) step.

(8) Counter-current depressurization (CnD): After step (7), the first bed is depressurized through the feed end (counter-currently) to at or near ambient pressure level. The effluent enriched in more selectively adsorbed species ($CO_2$ and $H_2S$) is then withdrawn from the first bed as a secondary product.

(9) Purge step (PU): Upon termination of the CnD step, the purge gas emanating from another bed undergoing PPU step is introduced to the product end of the first bed and the effluent is collected as a secondary product from the feed end of the first bed.

(10) Idle (I): During this step, the first bed is separated from other beds and left idle. The idle step is incorporated in order to align the operation of other interconnected steps.

(11) Top equalization re-pressurization step 4 (EQ4R): Following step (10), the bed pressure of the first bed is brought back to another intermediate level by introducing the void as well as desorbed gases from another bed that is undergoing EQ4D.

(12) Top equalization re-pressurization step 3 (EQ3R): Following step (11), the bed pressure of the first bed is brought back to another intermediate level by introducing the void as well as desorbed gases from another bed that is undergoing EQ3D.

(13) Top equalization re-pressurization step 2 (EQ2R): Following step (12), the bed pressure of the first bed is brought back to another intermediate level by introducing the void as well as desorbed gases from another bed that is undergoing EQ2D.

(14) Top equalization re-pressurization 1 with product re-pressurization step (EQ1R/RP): Following step (13), the bed pressure of the first bed is brought back to another intermediate level by introducing the void as well as desorbed gases from another bed that is undergoing EQ1D. Simultaneously, the primary product gas (containing a mixture of $H_2$ and CO) is introduced through the product end of the first bed.

(15) Product re-pressurization step (RP): Finally, the bed pressure of the first bed is brought back to the feed pressure level for initiation and repetition of the aforementioned cycle. The RP step is initiated through introducing part of the primary product (containing a mixture of $H_2$ and CO) produced during the feed step into the first bed.

The operation of the 10-bed multi-step SPSA cycle 400 of FIG. 4 is shown in the table of FIGS. 10A and 10B, in which the cycle step that is being performed in each bed during each phase of the multi-step SPSA cycle is shown. In this table, the acronyms shown refer to the following cycle steps: F (F1 or F2)=feed; R=rinse ($CO_2$ or $CO_2/H_2S$ rinse); EQ1D=top equalization depressurization 1; EQ2D=top equalization depressurization 2; EQ3D=top equalization depressurization 3; EQ4D=top equalization depressurization 4; PPU=provide product purge; CnD=counter-current depressurization; PU=product purge; I=idle; EQ4R=top equalization re-pressurization 4; EQ3R=top equalization re-pressurization 3; EQ2R=top equalization re-pressurization 2; EQ1R=top equalization re-pressurization 1; and RP=product re-pressurization.

For internal rinse options such as rinsing with the SPSA tail gas stream 209, a compressor is required to provide the gas at high pressure (typically up to 10-100 atm, depending on the type of gasification technology employed). Multi-stage compression with inter-cooling and water knockout can also be used.

In both applications of the SPSA cycle: (1) the cycle is capable of producing primary product continuously; (2) depending on the levels of impurities or known poisons, like tars from low temperature fixed or fluidized beds or compounds like HF that are known to degrade the adsorbent material, a TSA or guard bed may be required upstream of the SPSA inlet; (3) a small layer of adsorbent can be added to the bottom of the bed to remove moisture and/or entrained liquids if present in the SPSA feed gas; (4) the SPSA unit 108,208 operates with a feed pressure from 10 to 100 atm, depending on the type of gasification technology used, and the feed is supplied at a temperature ranging from 80 to 120 degrees F. (27 to 49 degrees C.); (5) the primary product from the SPSA unit 108,208 is obtained at the highest pressure of the cycle; (6) the tail gas stream 109,209 from the SPSA unit 108,208 is recovered at the lowest operating pressure of the cycle (preferably between 1-2 atm, more preferably at 1.7 atm); (7) the feed stream to the SPSA unit 108,208 contains anywhere from less than 0.02% to 3% $H_2S$ and typically greater than 25% $CO_2$; (8) the SPSA unit 108,208 removes sulfur containing species as well as $CO_2$; and/or (9) the tail gas stream 109,209 exiting from the SPSA unit 108,208 typically contains between 0.02 to 10% $H_2S$ and greater than 60% $CO_2$, which is further enriched in the AGE unit 112,212 to produce a high quality SRU feed gas 115,215.

With respect to the SPSA tail gas treatment units (i.e., AGE 112,212 and SRU 114,214): (1) the tail gas stream 109,209 from the SPSA unit 108,208 is sent to an AGE unit 112,212 to purify the tail gas stream (0.02 to 10% sulfur containing species) and produce a separate high quality gas stream (5 to 40% sulfur containing species) that can be sent directly to the SRU 114,214; (2) the configuration of the AGE unit 112,212 depends on the $H_2S$ level in the incoming stream as well as the final enrichment level; (3) a single stage AGE consisting of multiple absorbers, all with acid gas recycle from a common regenerator, is used as a preferred configuration; (4) the AGE unit 112,212 produces $H_2S$ enriched stream (5 to 40%) 115,215 and $H_2S$ depleted stream 117,217; (5) the $H_2S$ depleted stream 117,217 from the AGE 112,212 will be mostly $CO_2$ which can be sent for geological storage or sold for EOR applications, or vented to the atmosphere if permitted by local regulation; and/or (6) the enriched $H_2S$ stream 115,215 is sent to the SRU 114,214 to generate elemental sulfur or sulfuric acid (or products derived thereof).

Table 2 shows a summary of pressure, temperature, and compositions of the main streams of the SPSA unit 108 and AGE unit 112 for the $NH_3$ synthesis gas production system 100 as shown in FIG. 1:

TABLE 2

|  | SPSA | | | | AGE | | |
| --- | --- | --- | --- | --- | --- | --- | --- |
| Streams | 123 | 135 | 121 | 109 | 135 | 137 | 115 |
| T (° F.) | 104.00 | 104.00 | 112.51 | 128.59 | 111.00 | 111.00 | 111.00 |
| P (atm) | 33.6 | 33.6 | 33.6 | 1.7 | 1.7 | 1.7 | 1.2 |
| % of $H_2$ | 52.876 | — | 86.060 | 1.794 | 1.557 | 1.737 | 0.000 |
| % of $N_2$ | 0.262 | 100 | 13.907 | 28.810 | 25.000 | 27.888 | 0.000 |
| % of CO | 0.399 | — | 0.000 | 0.591 | 0.513 | 0.572 | 0.000 |
| % of $CO_2$ | 45.799 | — | 0.005 | 67.847 | 64.987 | 63.841 | 74.910 |
| % of $CH_4$ | 0.012 | — | 0.000 | 0.017 | 0.015 | 0.016 | 0.000 |
| % of AR | 0.019 | — | 0.028 | 0.003 | 0.003 | 0.003 | 0.000 |
| % of $H_2S$ | 0.438 | — | 0.000 | 0.650 | 2.610 | 0.015 | 25.090 |
| % of $H_2O$ | 0.195 | — | 0.000 | 0.288 | 5.315 | 5.928 | 0.000 |
| % of $NH_3$ | 0.000 | — | 0.000 | 0.000 | 0.000 | 0.000 | 0.000 |

Table 3 shows a summary of pressure, temperature, and compositions of the main streams of the SPSA unit 208 and AGE unit 212 for the 2:1 syngas production system 200 as shown in FIG. 2:

TABLE 3

|  | SPSA | | | | AGE | | |
| --- | --- | --- | --- | --- | --- | --- | --- |
| Streams | 223 | 221 | 209 | 233 | 235 | 237 | 215 |
| T (° F.) | 104.00 | 106.34 | 106.28 | 106.28 | 111.00 | 111.00 | 111.00 |
| P (atm) | 34.6 | 34.6 | 1.7 | 34.6 | 1.7 | 1.7 | 1.2 |
| % of $H_2$ | 43.342 | 67.304 | 3.780 | 3.780 | 3.393 | 3.785 | 0.000 |
| % of $N_2$ | 0.316 | 0.489 | 0.030 | 0.030 | 0.027 | 0.030 | 0.000 |
| % of CO | 20.774 | 31.131 | 3.673 | 3.673 | 3.296 | 3.677 | 0.000 |

TABLE 3-continued

| | SPSA | | | | AGE | | |
|---|---|---|---|---|---|---|---|
| Streams | 223 | 221 | 209 | 233 | 235 | 237 | 215 |
| % of $CO_2$ | 34.792 | 1.021 | 90.549 | 90.549 | 85.363 | 86.574 | 74.910 |
| % of $CH_4$ | 0.014 | 0.020 | 0.004 | 0.004 | 0.003 | 0.004 | 0.000 |
| % of AR | 0.022 | 0.035 | 0.002 | 0.002 | 0.002 | 0.002 | 0.000 |
| % of $H_2S$ | 0.521 | 0.000 | 1.383 | 1.383 | 2.616 | 0.015 | 25.090 |
| % of $H_2O$ | 0.219 | 0.000 | 0.579 | 0.579 | 5.300 | 5.913 | 0.000 |
| % of $NH_3$ | 0.000 | 0.000 | 0.000 | 0.000 | 0.000 | 0.000 | 0.000 |

While the principles of the invention have been described above in connection with preferred embodiments, it is to be clearly understood that this description is made only by way of example and not as a limitation of the scope of the claimed invention.

The invention claimed is:

1. A method comprising:
  (a) gasifying a carbonaceous feedstock to form a gasified stream comprising H2S, CO2, CO and H2;
  (b) converting at least a portion of the CO in the gasified stream to CO2 and H2 using a water-gas shift reaction, resulting in a sour syngas stream;
  (c) introducing the sour syngas stream into a sour pressure swing adsorption (SPSA) system having a plurality of adsorber beds;
  (d) performing a cyclic PSA process using the SPSA system comprising the following steps:
    (i) pressurizing a first bed of the plurality of adsorber beds to a first pressure;
    (ii) feeding the sour syngas stream into an inlet end of the pressurized first bed and discharging a first gas stream from an outlet end of the first bed;
    (iii) after the feeding step, introducing a rinse gas comprising at least 99 mol % N2 into the first bed, the rinse gas being from a source other than directly from another of the plurality of adsorber beds;
  (e) removing a product stream from the SPSA system, the product stream having a greater concentration of H2 than the sour syngas stream and comprising at least 80 mol % H2 and at least 10 mol % N2;
  (f) removing a tail gas stream from the SPSA system, the tail gas stream having a greater concentration of CO2 and H2S than the sour syngas stream; and
  (g) separating the tail gas stream into an H2S-enriched stream and a H2S-depleted stream using an acid gas enrichment (AGE) system.

2. The method of claim 1, wherein step (a) comprises gasifying a carbonaceous feedstock to form a gasified stream comprising CO, H2, at least 1000 ppm H2S, and at least 20 mol % CO2.

3. The method of claim 1, further comprising:
  (h) synthesizing a reactor product stream comprising at least 10 mol % NH3 from the product stream.

4. The method of claim 1, wherein step (d) further comprises:
  (iv) reducing the pressure of the first bed to a second pressure by placing the outlet end of the first bed in flow communication with an outlet end of a second bed of the plurality of adsorber beds while performing step (d)(iii).

5. The method of claim 4, wherein step (d) further comprises:
  (v) further reducing the pressure of the first bed to a third pressure by placing the outlet end of the first bed in flow communication with an outlet end of a third bed of the plurality of adsorber beds while performing (d)(iii).

6. The method of claim 5, wherein step (d) further comprises:
  (vi) after performing step (d)(iii) in the first bed, further reducing the pressure of the first bed to a fourth pressure by placing the outlet end of the first bed in flow communication with an outlet end of a fourth bed of the plurality of adsorber beds.

7. The method of claim 1, wherein step (d)(iii) comprises after the feeding step, introducing a rinse gas into the inlet end of the first bed, the rinse gas being from a source other than directly from another of the plurality of adsorber beds.

8. The method of claim 1, wherein step (d) further comprises:
  (iv) after performing step (d)(iii) in the first bed, reducing the pressure of the first bed to a second pressure by placing the outlet end of the first bed in flow communication with an outlet end of a second bed of the plurality of adsorber beds.

9. The method of claim 1, wherein step (g) comprises separating the tail gas stream into an H2S-enriched stream and a H2S-depleted stream using an acid gas enrichment (AGE) system, the H2S-enriched stream comprising at least 5 mol % H2S and no more than 95 mol % CO2.

10. The method of claim 1, further comprising:
  (k) converting at least a portion of the H2S-enriched stream to one or more selected from the group of sulfuric acid, elemental sulfur, a product derived from sulfuric acid, and a product derived from elemental sulfur using a sulfur recovery unit.

11. The method of claim 1, wherein step (b) comprises converting at least a portion of the CO in the gasified stream to CO2 and H2 using a water-gas shift reaction, resulting in a sour syngas stream comprising at least 0.02 mol % sulfur-containing species and 25 mol % CO2.

12. The method of claim 1, wherein step (c) comprises introducing the sour syngas stream into a sour pressure swing adsorption (SPSA) system having at least ten adsorber beds.

13. The method of claim 1, further comprising:
  (l) cooling the sour syngas stream after step (b) and before step (c).

14. The method of claim 1, further comprising:
  (m) after performing step (b) and before performing step (c), passing the sour syngas stream through a guard bed containing an adsorber adapted to remove organic tar compounds.

15. A method comprising:
  (a) gasifying a carbonaceous feedstock to form a gasified stream comprising H2S, CO2, CO and H2;
  (b) converting at least a portion of the CO in the gasified stream to CO2 and H2 using a water-gas shift reaction, resulting in a sour syngas stream;

(c) introducing the sour syngas stream into a sour pressure swing adsorption (SPSA) system having a plurality of adsorber beds;
(d) performing a cyclic PSA process using the SPSA system comprising the following steps:
 (i) pressurizing a first bed of the plurality of adsorber beds to a first pressure;
 (ii) feeding the sour syngas stream into an inlet end of the pressurized first bed and discharging a first gas stream from an outlet end of the first bed;
 (iii) after the feeding step, introducing a rinse gas comprising at least 85 mol % of one or more selected from the group of $CO_2$ and $H_2S$ into the first bed, the rinse gas being from a source other than directly from another of the plurality of adsorber beds.
(e) removing a product stream from the SPSA system, the product stream having a greater concentration of $H_2$ than the sour syngas stream;
(f) removing a tail gas stream from the SPSA system, the tail gas stream having a greater concentration of $CO_2$ and $H_2S$ than the sour syngas stream; and
(g) separating the tail gas stream into an $H_2S$-enriched stream and a $H_2S$-depleted stream using an acid gas enrichment (AGE) system.

16. The method of claim 15, wherein step (e) comprises removing a product stream from the PSA system, the product stream comprising at least 60 mol % $H_2$ and at least 25 mol % CO.

17. The method of claim 15, further comprising:
 (i) synthesizing a reactor product stream comprising at least 10 mol % MeOH from the product stream.

18. A method comprising:
(a) gasifying a carbonaceous feedstock to form a gasified stream comprising $H_2S$, $CO_2$, CO and $H_2$;
(b) converting at least a portion of the CO in the gasified stream to $CO_2$ and $H_2$ using a water-gas shift reaction, resulting in a sour syngas stream;
(c) introducing the sour syngas stream into a sour pressure swing adsorption (SPSA) system having a plurality of adsorber beds;
(d) performing a cyclic PSA process using the SPSA system comprising the following steps:
 (i) pressurizing a first bed of the plurality of adsorber beds to a first pressure;
 (ii) feeding the sour syngas stream into an inlet end of the pressurized first bed and discharging a first gas stream from an outlet end of the first bed;
 (iii) after the feeding step, introducing a rinse gas into the first bed, the rinse gas being from a source other than directly from another of the plurality of adsorber beds;
(e) removing a product stream from the SPSA system, the product stream having a greater concentration of $H_2$ than the sour syngas stream;
(f) removing a tail gas stream from the SPSA system, the tail gas stream having a greater concentration of $CO_2$ and $H_2S$ than the sour syngas stream;
(g) separating the tail gas stream into an $H_2S$-enriched stream and a $H_2S$-depleted stream using an acid gas enrichment (AGE) system; and
(h) recycling at least a portion of the $H_2S$-depleted stream for pneumatically conveying the carbonaceous feedstock in step (a).

\* \* \* \* \*